United States Patent
Halcom et al.

(10) Patent No.: US 11,771,611 B2
(45) Date of Patent: Oct. 3, 2023

(54) VERTICALLY ADJUSTABLE BOOM HEAD AND CABLE MANAGEMENT THEREFOR

(71) Applicant: Stryker Corporation, Kalamazoo, MI (US)

(72) Inventors: Lancer Drake Halcom, Coppell, TX (US); Dustin Ryan Campbell, Fort Worth, TX (US); Wojciech Kazimierz Timoszyk, Flower Mound, TX (US); Matthew Ryan Adamo, Flower Mound, TX (US); David P. Chase, Southlake, TX (US)

(73) Assignee: Stryker Corporation, Kalamazoo, MI (US)

( * ) Notice: Subject to any disclaimer, the term of this patent is extended or adjusted under 35 U.S.C. 154(b) by 65 days.

(21) Appl. No.: 17/480,105

(22) Filed: Sep. 20, 2021

(65) Prior Publication Data
US 2022/0142844 A1 May 12, 2022

Related U.S. Application Data

(63) Continuation of application No. 16/402,087, filed on May 2, 2019, now Pat. No. 11,123,249.

(Continued)

(51) Int. Cl.
| | |
|---|---|
| *A61G 12/00* | (2006.01) |
| *F16M 13/02* | (2006.01) |
| *F16M 11/28* | (2006.01) |

(52) U.S. Cl.
CPC ......... *A61G 12/004* (2013.01); *A61G 12/005* (2013.01); *F16M 11/28* (2013.01); *F16M 13/022* (2013.01); *F16M 13/027* (2013.01)

(58) Field of Classification Search
CPC .. A61G 12/002; A61G 12/004; A61G 12/005; A61G 12/007; A61G 12/008;
(Continued)

(56) References Cited

U.S. PATENT DOCUMENTS

| | | | |
|---|---|---|---|
| 2,028,556 A | | 1/1936 | Murdock |
| 3,213,877 A | * | 10/1965 | May ................... A61G 12/004 137/355.16 |

(Continued)

FOREIGN PATENT DOCUMENTS

| | | | |
|---|---|---|---|
| DE | 29805019 U1 * | 5/1998 | ........... A61G 12/004 |
| DE | 29805019 U1 | 6/1998 | |

(Continued)

OTHER PUBLICATIONS

Halcom et al., U.S. Election of Species Requirement dated Oct. 2, 2020, directed to U.S. Appl. No. 16/402,087; 6 pages.

(Continued)

*Primary Examiner* — Eret C McNichols
(74) *Attorney, Agent, or Firm* — MORRISON & FOERSTER LLP

(57) ABSTRACT

A gripping assembly for gripping at least one conduit routed within a vertically adjustable medical boom head assembly includes a support, and a plurality of grip paddles pivotally mounted to the support and arranged around a central pathway for routing the at least one conduit, wherein the grip paddles are configured to pivot inwardly relative to the central pathway to grip the at least one conduit running through the central pathway.

8 Claims, 24 Drawing Sheets

Related U.S. Application Data

(60) Provisional application No. 62/665,819, filed on May 2, 2018.

(58) Field of Classification Search
CPC ....... F16L 3/01; F16L 3/04; F16L 3/06; F16L 3/105; F16L 3/1066; F16L 3/1211; F16L 7/00; F16M 11/28; F16M 13/022; F16M 13/027

See application file for complete search history.

(56) References Cited

U.S. PATENT DOCUMENTS

| | | | |
|---|---|---|---|
| 3,353,875 A | | 11/1967 | Karge |
| 3,361,459 A | | 1/1968 | Marquis et al. |
| 3,413,693 A | * | 12/1968 | Tonnelline ............... F16B 2/065 24/284 |
| 3,431,937 A | * | 3/1969 | Smith ................... A61G 12/002 137/355.16 |
| 3,463,243 A | | 8/1969 | Fisher |
| 3,548,122 A | * | 12/1970 | Hay ..................... A61G 13/107 104/118 |
| 3,556,455 A | | 1/1971 | Storm |
| 3,558,103 A | | 1/1971 | Lodige |
| 3,778,174 A | | 12/1973 | Molby |
| 4,240,683 A | | 12/1980 | Crase |
| 4,316,238 A | | 2/1982 | Booty |
| 4,413,866 A | | 11/1983 | Geisey |
| 4,567,815 A | | 2/1986 | Kocher |
| 4,574,963 A | | 3/1986 | Fullenkamp |
| 4,718,519 A | | 1/1988 | Barker |
| 4,795,122 A | | 1/1989 | Petre |
| 4,901,967 A | | 2/1990 | Petre |
| 5,014,693 A | | 5/1991 | Wright, II et al. |
| 5,026,017 A | | 6/1991 | Kreuzer |
| 5,108,064 A | | 4/1992 | Kreuzer |
| 5,158,525 A | | 10/1992 | Nikkel |
| 5,274,980 A | | 1/1994 | Zeigler |
| 5,452,807 A | | 9/1995 | Foster |
| 5,618,090 A | | 4/1997 | Montague |
| 6,095,468 A | | 8/2000 | Chirico |
| 6,192,905 B1 | | 2/2001 | Mincy et al. |
| 6,196,649 B1 | | 3/2001 | Block |
| 6,231,526 B1 | | 5/2001 | Taylor |
| 6,471,363 B2 | | 10/2002 | Howell |
| 6,474,873 B1 | | 11/2002 | Fett et al. |
| 6,639,623 B2 | * | 10/2003 | Howell ................. F16M 11/10 362/11 |
| 7,065,811 B2 | * | 6/2006 | Newkirk ................ F16M 11/26 5/658 |
| 7,254,850 B2 | * | 8/2007 | Newkirk ................ F16M 11/26 137/355.16 |
| 7,357,772 B2 | * | 4/2008 | McDermott ......... A61B 5/0205 600/22 |
| 7,726,823 B2 | | 6/2010 | Rus |
| 7,770,860 B1 | | 8/2010 | Culpepper |
| 7,832,933 B2 | | 11/2010 | Adams et al. |
| 7,845,601 B1 | | 12/2010 | Culpepper |
| 7,849,978 B2 | * | 12/2010 | Graham ............... A61G 13/107 188/74 |
| 3,070,331 A1 | | 12/2011 | Gull |
| 8,616,772 B1 | | 12/2013 | Kellar et al. |
| 9,945,498 B2 | | 4/2018 | Timoszyk et al. |
| 10,041,625 B2 | | 8/2018 | Volkenand |
| 10,518,062 B2 | * | 12/2019 | Volkenand ......... F16M 11/2014 |
| 10,780,006 B2 | * | 9/2020 | Oginski ............. F16M 11/2014 |
| 10,874,477 B2 | | 12/2020 | Bellows |
| 2004/0199996 A1 | | 10/2004 | Newkirk |
| 2005/0092874 A1 | | 5/2005 | Lawhorn |
| 2006/0207025 A1 | * | 9/2006 | Newkirk ............... A61G 12/004 5/658 |
| 2006/0217723 A1 | | 9/2006 | Suh |
| 2006/0226308 A1 | | 10/2006 | White |
| 2007/0067911 A1 | | 3/2007 | Graham |
| 2007/0126318 A1 | | 6/2007 | Hamberg |
| 2010/0258694 A1 | | 10/2010 | Steger |
| 2012/0216345 A1 | | 8/2012 | Hand |
| 2013/0338430 A1 | | 12/2013 | Volkenand |
| 2015/0184779 A1 | * | 7/2015 | Timoszyk ............. A61B 90/30 285/282 |
| 2016/0296297 A1 | | 10/2016 | Perplies et al. |
| 2017/0003012 A1 | | 1/2017 | Schreiber |
| 2017/0003015 A1 | | 1/2017 | Schreiber |
| 2017/0222419 A1 | | 8/2017 | Oginski |
| 2017/0341232 A1 | | 11/2017 | Perplies |
| 2018/0017736 A1 | | 1/2018 | Boccoleri et al. |
| 2018/0228680 A1 | | 8/2018 | Oginski |
| 2018/0259122 A1 | | 9/2018 | Reavill et al. |
| 2020/0278080 A1 | | 9/2020 | Erens |

FOREIGN PATENT DOCUMENTS

| | | | |
|---|---|---|---|
| DE | 202011101244 U1 | | 10/2011 |
| EP | 0943306 B1 | | 6/2002 |
| GB | 1005910 A | * | 9/1965 |
| GB | 1005910 A | | 9/1965 |

OTHER PUBLICATIONS

Halcom et al., U.S. Notice of Allowance and Fee(s) Due dated May 24, 2021, directed to U.S. Appl. No. 16/402,087; 7 pages.

Halcom et al., U.S. Office Action dated Jan. 26, 2021, directed to U.S. Appl. No. 16/402,087; 13 pages.

Igus. (2013) "Rotary motion cable carriers," located at http://www.igus.com/wpck/3820/rotary_motion_applications?C=US&L=en (10 pages).

Treotham. (2013). "Circular Movement," located at http://www.treotham.com.au/catalogue/category/energy-chains/circular-movement/ (1 page).

* cited by examiner

VERTICALLY ADJUSTABLE BOOM HEAD AND CABLE MANAGEMENT THEREFOR

CROSS-REFERENCE TO RELATED APPLICATIONS

This application is a continuation of U.S. patent application Ser. No. 16/402,087, filed May 2, 2019, which claims priority to U.S. Provisional Application No. 62/665,819, filed May 2, 2018, the contents of each of which are incorporated by reference herein in their entirety.

FIELD

This application relates generally to the field of surgical devices, and more particularly to providing a vertically adjustable boom head and cable management therefore.

BACKGROUND

Many patient medical areas including operating rooms and critical care areas have service or boom heads that provide services, such as gas outlets, video plates and electrical outlets, to areas as needed (e.g., a location near patients). Some of these service or boom heads are located at or in walls and some are connected to suspension arms. An easier system for providing the services to a particular location is desired.

SUMMARY

According to some embodiments, a medical device assembly includes a movable suspension arm, a vertically adjustable service head located at an end of the suspension arm, the vertically adjustable service head including a service head face with outlets thereon, and conduits routed by the suspension arm, into the vertically adjustable service head in a horizontal direction and vertically within the vertically adjustable service head to the outlets. The vertically adjustable service head includes a vertically adjustable column for raising and lowering the outlets. Slack in the conduits for permitting extension of the vertically adjustable column is collected in the upper portion of the vertically adjustable service head above the vertically adjustable column.

According to some embodiments, a vertically adjustable service head assembly includes a service head face with outlets thereon, a vertically adjustable column for raising and lowering the outlets, and conduits routed into the vertically adjustable service head assembly at an inlet and vertically within the vertically adjustable service head assembly to the outlets. The conduits are anchored adjacent the inlet at a first anchor location and anchored above the outlets at a movable second anchor location. A first distance between the first anchor location and the movable second anchor location is adjustable with a first fixed length of the conduits being located between the first anchor location and the movable second anchor location. A second fixed length of the conduits is located between the movable second anchor location and the outlets. A second distance between the movable second anchor location and the outlets is a fixed distance.

According to some embodiments, a method of routing conduits in a medical facility includes providing conduits; routing the conduits in a horizontal direction and vertically to at least one outlet; anchoring the conduits at a first anchor location; anchoring the conduits above the at least one outlet at a vertically movable second anchor location; providing a first fixed length of the conduits between the first anchor location and the vertically movable second anchor location; adjusting a first distance between the first anchor location and the vertically movable second anchor location; and providing a second fixed length of the conduits between the vertically movable second anchor location and the at least one outlet; wherein a second distance between the vertically movable second anchor location and the outlets is a fixed distance.

BRIEF DESCRIPTION OF THE DRAWINGS

One or more embodiments of the present disclosure are illustrated by way of example and should not be construed as being limited to the specific embodiments depicted in the accompanying drawings, in which like reference numerals indicate similar elements.

The specific devices and processes illustrated in the attached drawings and described in the following specification are simply exemplary embodiments of the inventive concepts. Hence, specific dimensions and other physical characteristics relating to the embodiments disclosed herein are not to be considered as limiting.

DETAILED DESCRIPTION

Reference will now be made in detail to implementations and embodiments of various aspects and variations of the invention, examples of which are illustrated in the accompanying drawings. Although at least two variations of the systems, methods and uses are described, other variations of the systems, methods and uses may include aspects of the systems, methods and uses described herein combined in any suitable manner having combinations of all or some of the aspects described.

For purposes of description herein, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
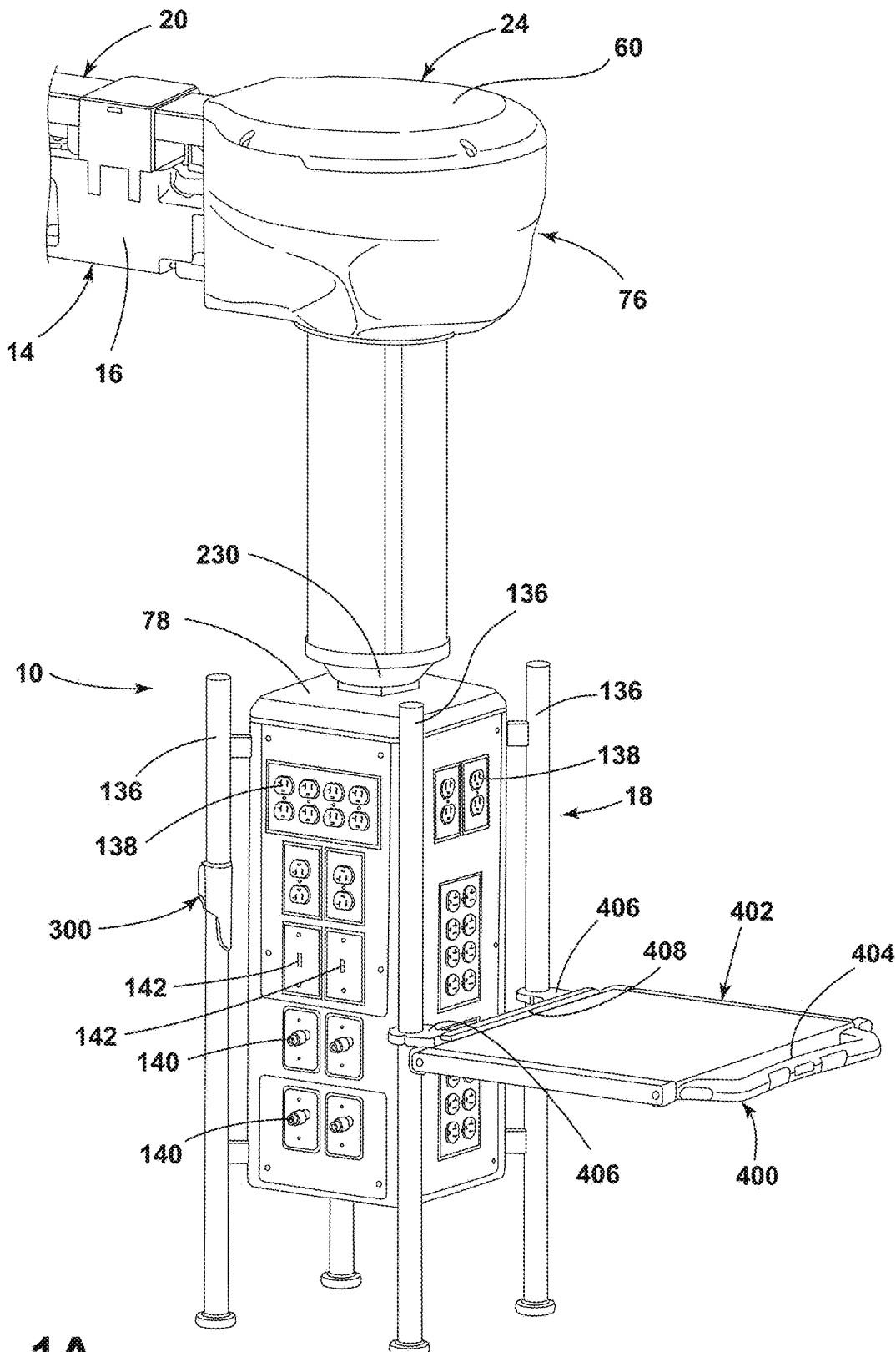
FIG. 1A is a perspective view of a suspension arm assembly according to an embodiment.
Figure 1B:
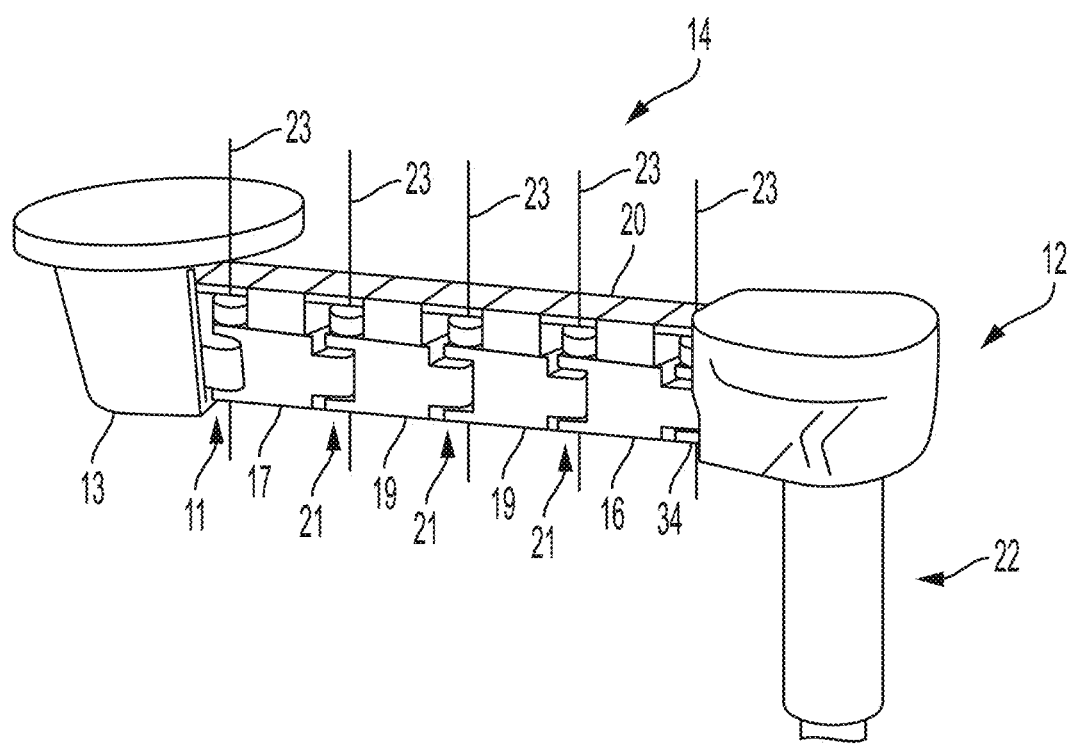
FIG. 1B is a perspective view of a suspension arm assembly according to an embodiment.

The reference number 10 (FIG. 1A) generally designates a suspension arm assembly of the present embodiment. The suspension arm assembly 10 includes a vertically adjustable boom head assembly 12 located at an end of a suspension arm 14. The illustrated suspension arm 14 with the vertically adjustable boom head assembly 12 at an end thereof is configured to be positioned within a room (e.g., an operating room or critical care area) and is configured to assist the medical personnel in the room in performing various functions (e.g., supporting equipment and providing gas, electrical power and data connectivity). The suspension arm 14 can be connected to a ceiling or any structure (fixed or movable) to support the vertically adjustable boom head assembly 12 above a support surface, such as a floor. Any configuration of a suspension arm 14 could be used. For example, the suspension arm 14 could be the suspension arm assembly as disclosed in U.S. patent application Ser. No. 15/902,288 entitled MEDICAL MULTI-LINK BOOM, the entire contents of which are incorporated herein by reference. In FIG. 1A, only an end link 16 of the suspension arm 14 is illustrated. FIG. 1B illustrates the vertically adjustable boom head assembly 12 located at an end of a four-link suspension arm 14, in accordance with the disclosure of U.S. patent application Ser. No. 15/902,288. The suspension arm 14 is connected at one end to a ceiling connector 13 via a joint 11, which may be a single degree of freedom rotational joint, and at the opposite end to the vertically adjustable boom head assembly 12. The suspension arm 14 includes a ceiling connector link 17 for connecting the suspension arm 14 to the ceiling connector 13 and an end link 16 at the opposite end for connecting the vertically adjustable boom head assembly 12. Two intermediate links 19 are provided between the ceiling connector link 17 and the end link 16. In the illustrated embodiment, each of the links is connected to the adjacent link(s) by a single degree of freedom rotational joint 21 such that the links are rotatable relative to one another about vertical axes of rotation 23. The links can be rotated relative to one another to provide for multiple end locations for the vertically adjustable boom head assembly 12. According to some embodiments, since each joint 21 is a single degree of freedom joint with a vertical rotational axis 23, movement of the suspension arm during use is restricted to a horizontal plane. As mentioned above and described in detail below, the boom head assembly 12 provides vertical adjustability for a service head 18.

Returning to FIG. 1A, in the illustrated embodiment, the vertically adjustable boom head assembly 12 includes a service head 18 that is configured to provide fluids (liquid or gas), power and/or data to users of the suspension arm assembly 10. As shown in FIG. 1, conduits 20 extend horizontally along the suspension arm 14 and pass into the vertically adjustable boom head assembly 12 to provide the fluids, power and/or data to the service head 18. While the conduits 20 are illustrated as being a unitary body for reference, the conduits 20 can be a plurality of tubes that are grouped together. Each tube of the conduits 20 leads to at least one output on the service head 18 (e.g., a power outlet 138, a fluid outlet 140 and/or a data outlet 142). Although the service head 18 is shown as having a rectangular cross-section, it is contemplated that the service head 18 could have any cross-sectional shape (e.g., triangular) and the outlets could be located on any or all of the faces of the service head 18. The vertically adjustable boom head assembly 12 includes a vertically adjustable column 22 between the suspension arm 14 and the service head 18. The conduits 20 are passed from the suspension arm 14 to the service head 18 through the vertically adjustable column 22. The vertically adjustable column 22 also allows the service head 18 to be raised and lowered relative to the end of the suspension arm 14 (e.g., the end link 16) and the ground.

Figure 3:
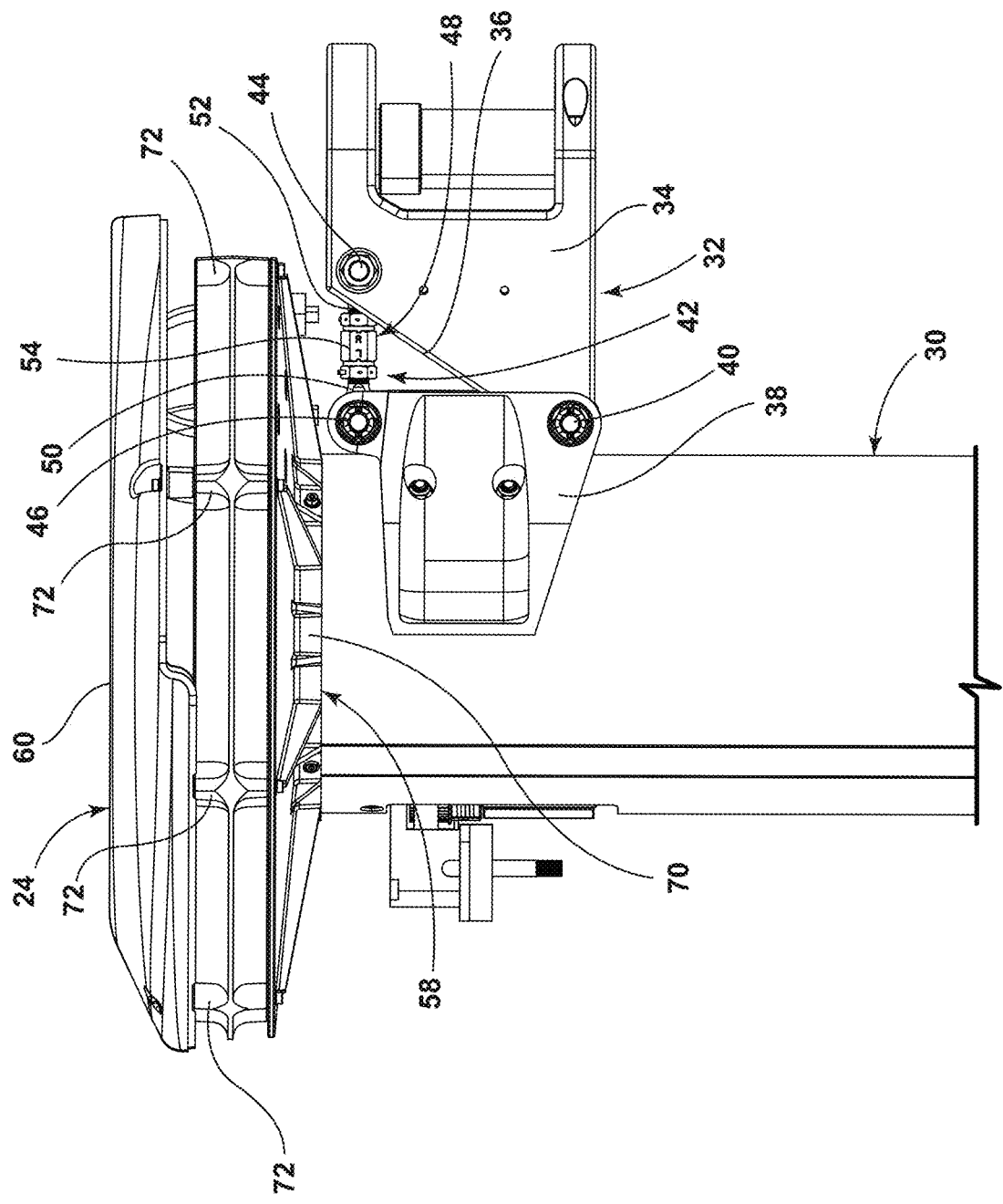
FIG. 3 is a partial side view of a top pod, telescoping tube assembly and suspension arm of the suspension arm assembly according to an embodiment.

The illustrated vertically adjustable column 22 of the vertically adjustable boom head assembly 12 routes the conduits 20 from the suspension arm 14 to the service head 18. The vertically adjustable column 22 can include a top pod 24 and a telescoping tube assembly 26 connected to the bottom of the top pod 24. The telescoping tube assembly 26 includes an inner telescoping tube 28 (see FIG. 4) and an outer telescoping tube 30. As illustrated in FIG. 3, the end link 16 of the suspension arm 14 may be connected to the outer telescoping tube 30 by a connection joint 32, which can be a single degree of freedom rotational joint that is configured to rotate about a vertical axis 23. The connection joint 32 can include an arm bracket 34 having an angled end face 36 at the end of the end link 16 and a tube bracket 38 connected to the outer telescoping tube 30. The tube bracket 38 can straddle the arm bracket 34, with a bottom pin 40 extending through a bottom of both the arm bracket 34 and the tube bracket 38 to connect the arm bracket 34 to the tube bracket 38. It is contemplated that the vertically adjustable boom head assembly 12 could be connected to the end of the suspension arm 14 in other manners.

In the illustrated example, a leveling assembly 42 can connect a top of the arm bracket 34 to the tube bracket 38. The leveling assembly 42 can include an arm rod 44 extending through the top of the arm bracket 34, a tube rod 46 extending through the top of the tube bracket 38 in a position substantially parallel to the arm rod 44, and an adjustable rod 48 extending between the tube rod 46 and the arm rod 44. The adjustable rod 48 is adjustable in length such that shortening the adjustable rod 48 will cause the arm bracket 34 to rotate about the bottom pin 40 to move the tube rod 46 closer to the arm rod 44. Contrarily, lengthening the adjustable rod 48 will cause the arm bracket 34 to rotate about the bottom pin 40 to move the tube rod 46 away from the arm rod 44. Therefore, adjustment of the adjustable rod 48 will alter the angle of the vertically adjustable boom head assembly 12 relative to the end of the suspension arm 14 to allow for the vertically adjustable boom head assembly 12 to assume a substantially vertical orientation upon assembly of the suspension arm assembly 10. The adjustable rod 48 can be any member that is adjustable in length. For example, the adjustable rod 48 can include an externally threaded shaft 50 connected to one of the tube rod 46 and the arm rod 44 and a shaft 52 connected to the other of the tube rod 46 and the arm rod 44, with the shaft 52 having a freely rotatable internally threaded nut member 54 such that rotation of the freely rotatable internally threaded nut member 54 will move the externally threaded shaft 50 into and out of the freely rotatable internally threaded nut member 54 to adjust the length of the adjustable rod 48. While the adjustable rod 48 is illustrated as being at the top of the arm bracket 34 and the tube bracket 38, the leveling assembly 42 could be inverted and still perform the same. It is contemplated that the leveling assembly 42 can also assist in shipping of the suspension arm assembly 10 to allow the vertically adjustable boom head assembly 12 to be folded relative to the suspension arm 14 for a more compact shipping structure. During shipping, the conduits 20 can be routed through the suspension arm 14 and the vertically adjustable boom head assembly 12, but not locked into position within the vertically adjustable column 22 as outlined below until after assembly.

Figure 2:
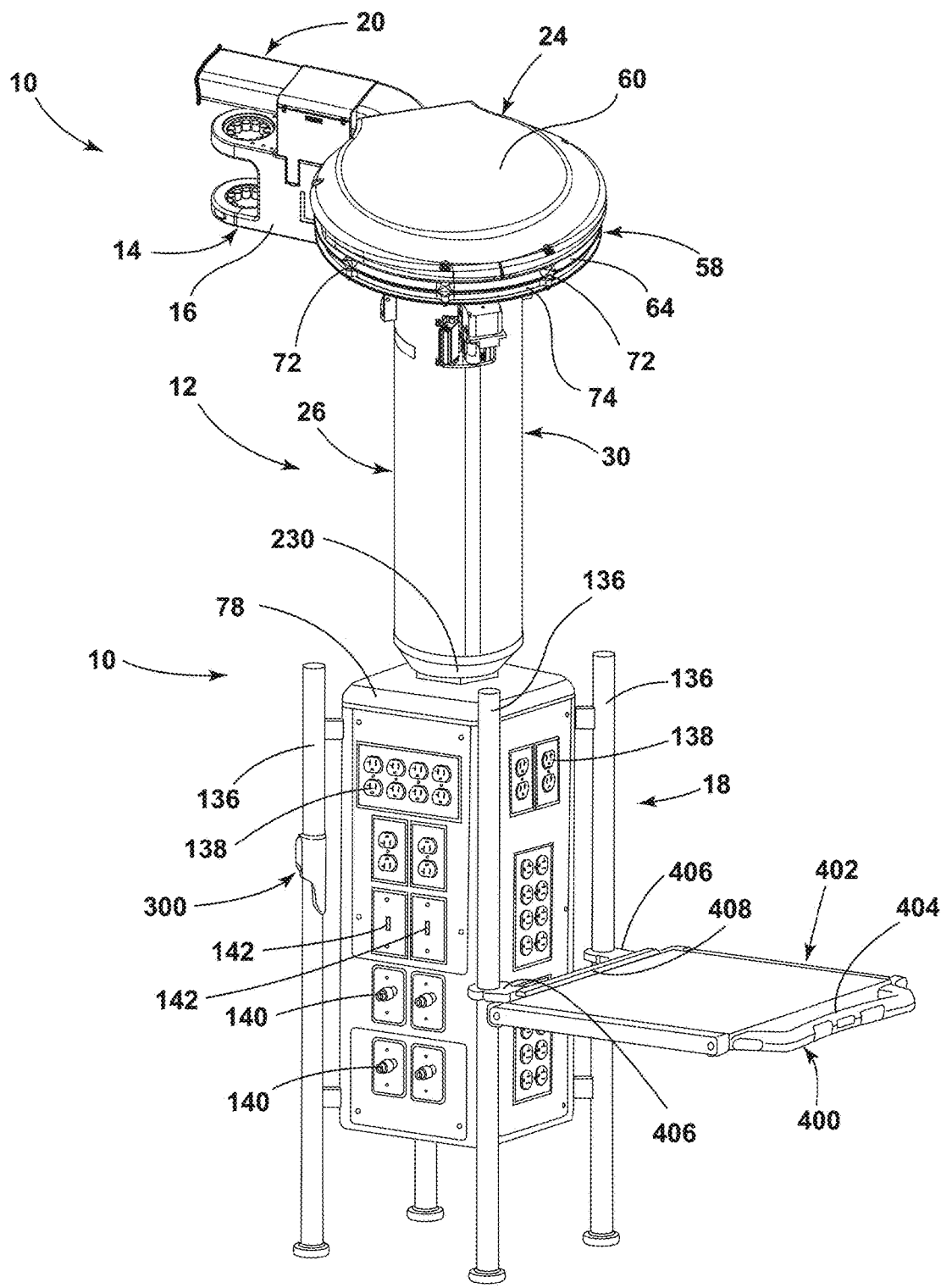
FIG. 2 is a perspective view of the suspension arm assembly according to an embodiment with a cover of a vertically adjustable column removed.
Figure 6:
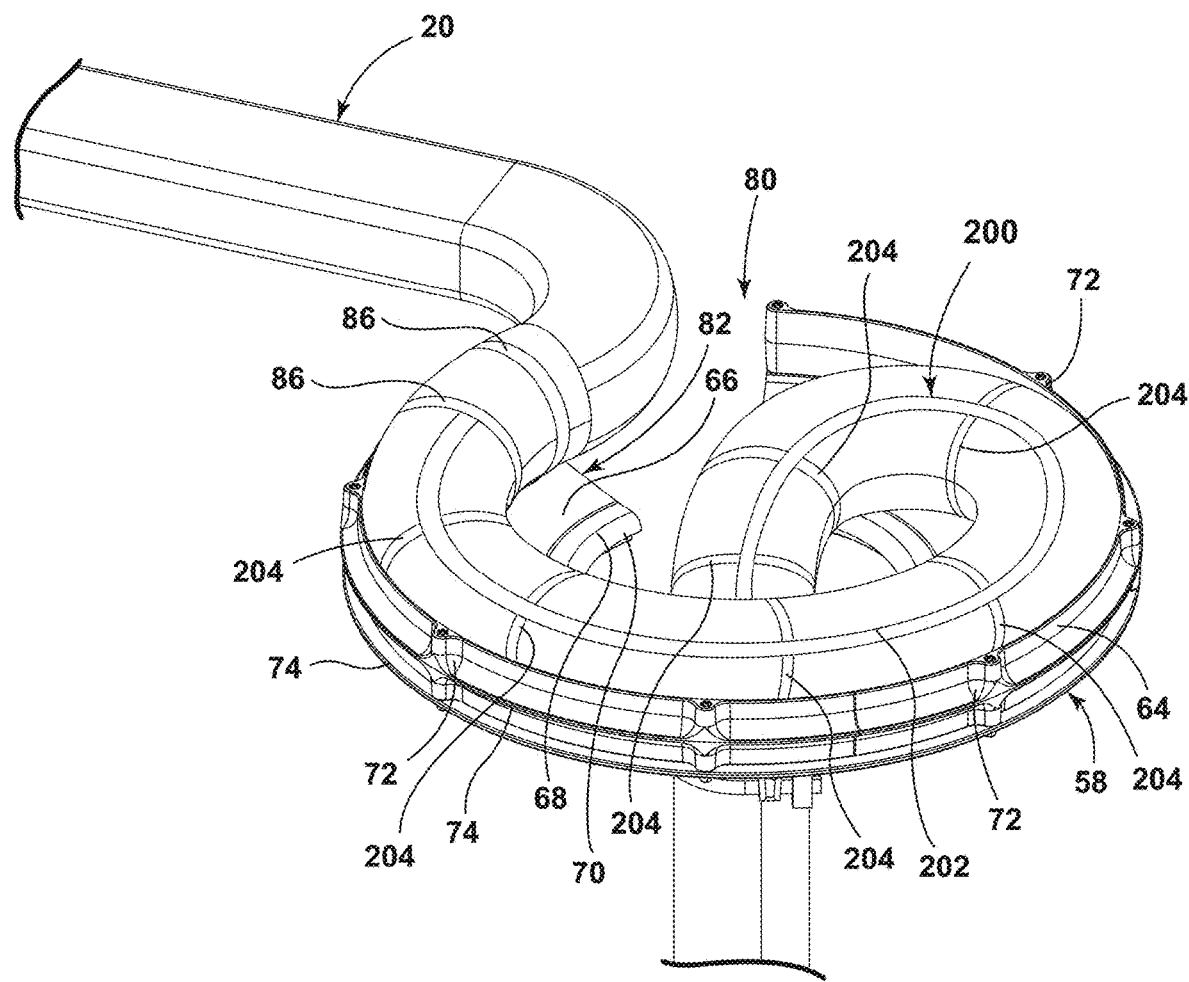
FIG. 6 is a first top perspective view of the receiving disc and conduits according to an embodiment when the vertically adjustable column is in a compact position.

The illustrated top pod 24 is located at the top of the vertically adjustable boom head assembly 12 and can include a receiving disc 58 and a top cover 60. The top cover 60 can be disc-shaped and configured to cover an interior 62 of the receiving disc 58. The receiving disc 58 includes a substantially circular side wall 64, a disc-shaped floor 66 having a center hole 68 and a funnel 70 at a bottom of the disc-shaped floor 66 axially aligned with the center hole 68. As illustrated in FIGS. 2, 3 and 6, the side wall 64 of the receiving disc 58 includes a plurality of fastener tubes 72. The top cover 60 is connected to the receiving disc 58 by inserting fasteners into an opening at a periphery of the top cover 60 and into the fastener tubes 72. It is contemplated that the top cover 60 could be connected (e.g., removably) to the receiving disc 58 in any manner. The exterior surface of the side wall 64 of the receiving disc 58 can include ridges 74, which can assist in holding a cover 76 that covers the receiving disc 58 and a top portion of the outer telescoping tube 30. It is contemplated that the cover 76 can be made of a stable structure (e.g., plastic). Alternatively, it is contemplated that the cover 76 could cover the entire telescoping tube assembly 26 during vertical lengthening thereof (e.g., a telescoping or bellowing cover) that is connected to a top surface 78 of the service head 18.

In the illustrated example, the top pod 24 is configured to route the conduits 20 from the suspension arm 14 to the telescoping tube assembly 26 and to collect the slack in the conduits 20 while the telescoping tube assembly 26 is moved to a compact position. As illustrated in FIGS. 5-8, the side wall 64 and the disc-shaped floor 66 of the receiving disc 58 includes an open channel 80. The open channel 80 portion of the side wall 64 allows for easy routing the conduits 20 into the top pod 24 from the suspension arm 14. It is contemplated that the side wall 64 and the disc-shaped floor 66 of the receiving disc 58 can be a single integral piece or can be formed from separate pieces. If the side wall 64 and the disc-shaped floor 66 of the receiving disc 58 are separate pieces, the portion of the open channel 80 in the receiving disc 58 allows the receiving disc 58 to easily be removed and replaced (e.g., if damaged) without disassembling the vertically adjustable boom head assembly 12.

Figure 7:
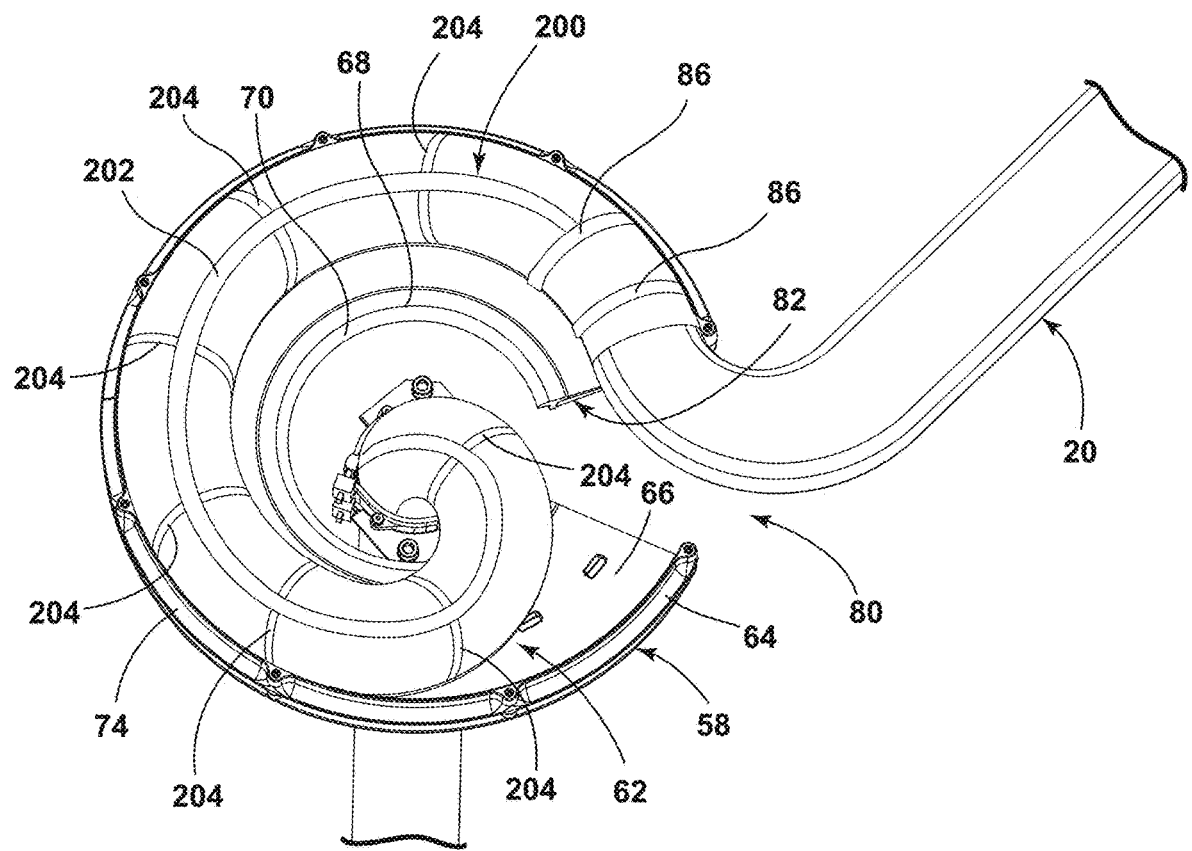
FIG. 7 is a second top perspective view of the receiving disc and conduits according to an embodiment when the vertically adjustable column is in the compact position.

As illustrated in FIGS. 6 and 7, in some embodiments, the conduits 20 extend horizontally along the suspension arm 14 and enter the receiving disc 58 of the top pod 24 through the open channel 80 and are routed around the interior 62 of the receiving disc 58 from a first end 82 of the receiving disc 58 adjacent the open channel 80 and around the interior 62 toward a second end 84 of the receiving disc 58. Before the conduits 20 reach the second end 84 of the receiving disc 58, the conduits 20 are routed through the center hole 68 and a center of the funnel 70. As shown in FIGS. 6 and 7, straps 86 adjacent the first end 82 of the receiving disc 58 adjacent the open channel 80 surround the conduits 20 and capture the conduits 20. The straps 86 prevent substantial movement of the conduits 20 captured therein. However, the portion of the conduits 20 located after the straps 86 are allowed to rest in the interior 62 of the receiving disc 58 or move through the center hole 68 and a center of the funnel 70. While two straps 86 are shown, it is contemplated that any number of straps 86 (including a single strap 86) could be used. The straps 86 include at least one end that is removable from the receiving disc 58 to allow the conduits 20 to be routed through straps 86 and then allow both ends of the straps 86 to be connected to the receiving disc 58. The interior space of the straps 86 is adjustable to be able to securely grip the conduits 20 therein. It is contemplated that the straps 86 can be zip ties, Velcro® straps or any other connector that each extend through a pair of holes 87 in the disc-shaped floor 66 of the receiving disc 58 to connect the straps 86 to the receiving disc 58.

Figure 8:
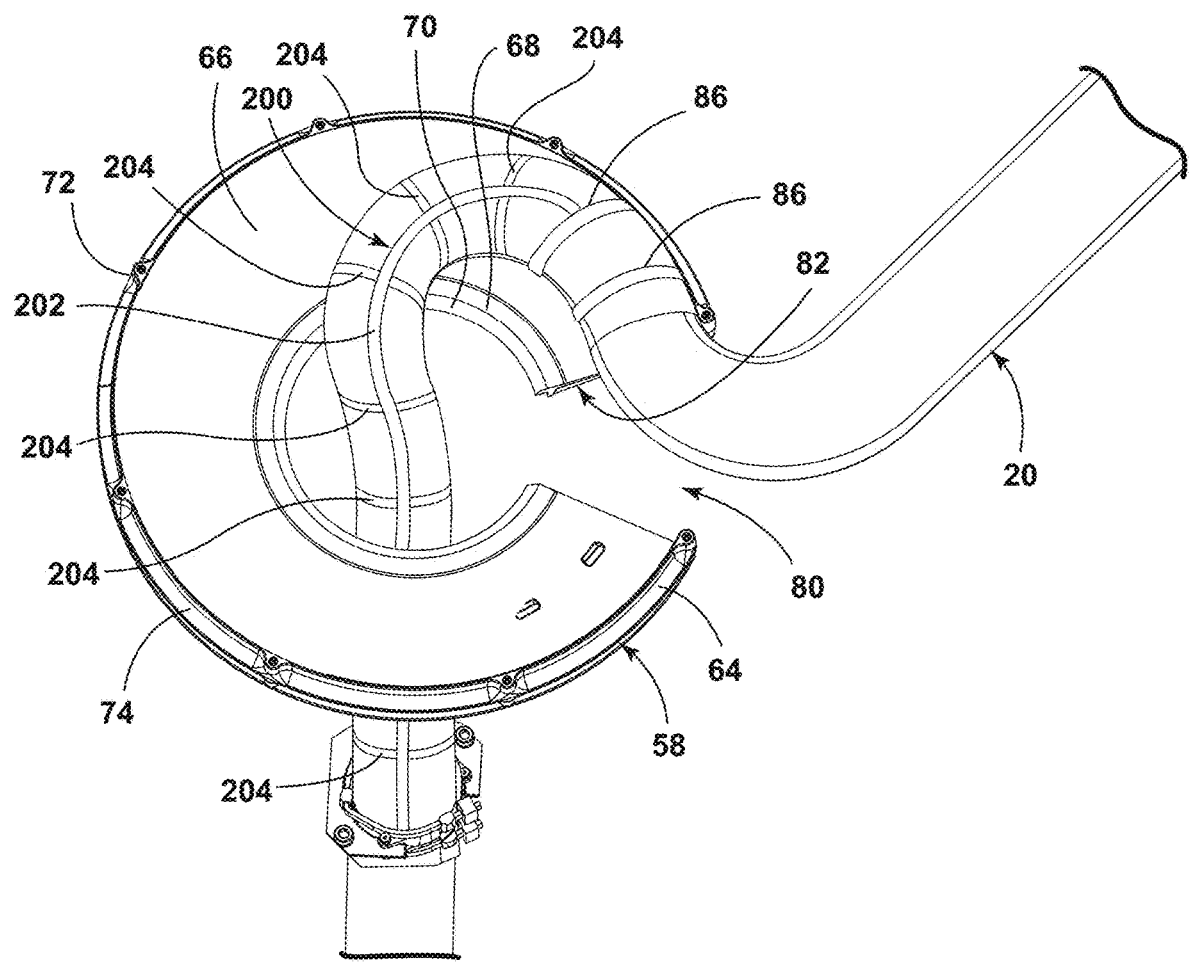
FIG. 8 is the second top perspective view of the receiving disc and conduits according to an embodiment when the vertically adjustable column is in an extended position.

FIGS. 6 and 7 illustrate the position of the conduits 20 into and through the receiving disc 58 of the top pod 24 when the vertically adjustable column 22 is in a compact position (i.e., when the service head 18 is closest to the suspension arm 14). However, as the vertically adjustable column 22 is lengthened (e.g., when the telescoping tube assembly 26 is lengthened), the conduits 20 after the straps 86 are pulled through the center hole 68 and a center of the funnel 70 as illustrated in FIG. 8. As the vertically adjustable column 22 is once again compacted or shortened (e.g., when the telescoping tube assembly 26 is shortened), the conduits 20 after the straps 86 are pushed back through the center hole 68 and the center of the funnel 70 into the interior 62 of the receiving disc 58 toward the position as shown in FIGS. 6 and 7. The top pod 24 therefor receives the slack in the conduits 20 as the service head 18 is raised away from the disc-shaped floor 66 along with preventing the conduits 20 from bending in an undesirable manner.

Figure 23:
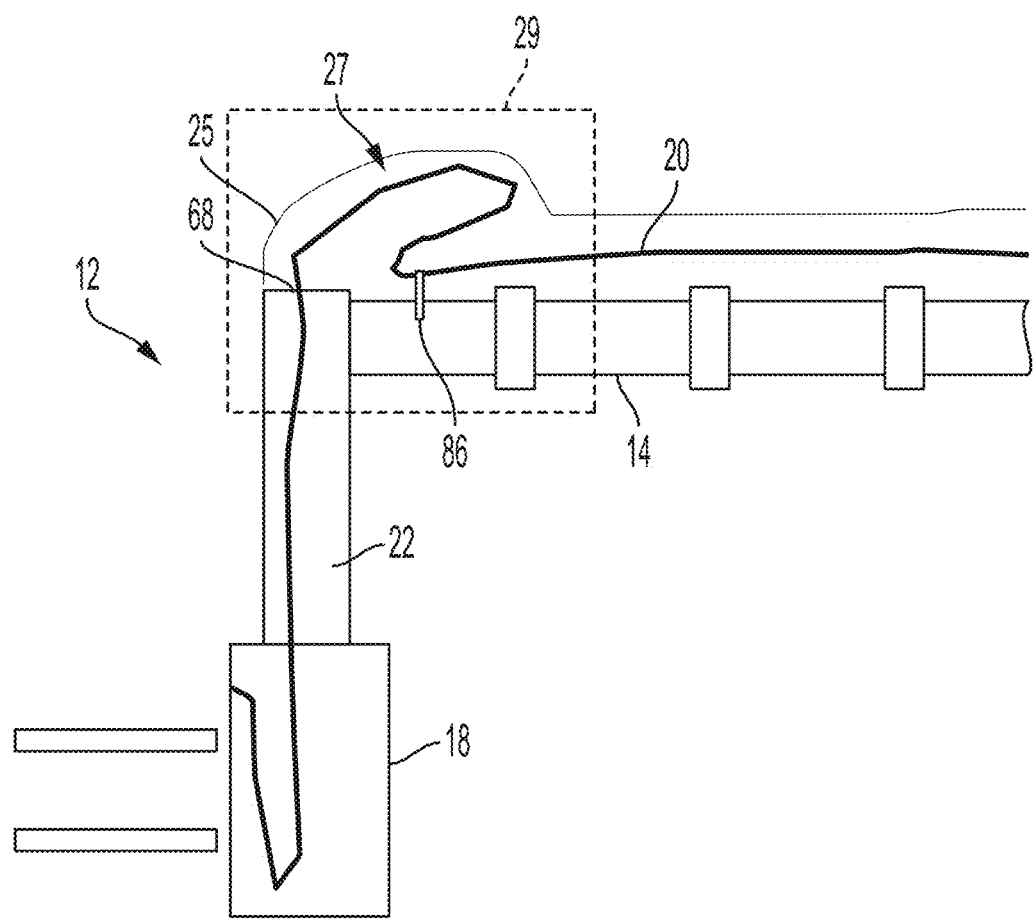
FIG. 23 is a schematic illustration of an alternate embodiment for collecting the conduits in the top of the vertically adjustable boom head assembly, according to some embodiments.

FIG. 23 is a schematic illustration of an alternate embodiment for collecting the conduits in the top of the vertically adjustable boom head assembly 12. In the illustrated embodiment, rather than the conduits being coiled in a horizontal plane as in the embodiment of FIGS. 6-8, the conduits fold in a vertical plane. FIG. 23 illustrates the vertically adjustable column 22 in a compact position with the service head 18 is closest to the suspension arm 14. The slack 27 in the conduits 20 collects in the top of the vertically adjustable boom head assembly by folding in the vertical plane 29. This folding may be guided, for example, by an energy chain and/or by a vertically oriented channel. In some embodiments, the folded conduits 20 may be housed in a top pod 25 while in other embodiments the conduits are exposed at the top of the vertically adjustable boom head assembly 12. In some embodiments, the top pod 25 comprises a disc-shaped shroud for guiding the coiling/folding of the conduits 20. As the vertically adjustable column 22 is lengthened (e.g., when the telescoping tube assembly 26 is lengthened), the slack in the conduits 20 after the strap 86 is pulled through the center hole 68. As the vertically adjustable column is shortened, the slack may be guided back into the folded position by the shroud 25 and/or the configuration of the energy chain.

In the illustrated example, the vertically adjustable column 22 includes a cinch plate 90 (see FIGS. 4 and 9-12) that grips the conduits 20 to pull and push the conduits 20 through the center hole 68 and the center of the funnel 70 of the receiving disc 58 as the telescoping tube assembly 26 extends and retracts, respectfully. The cinch plate 90 also manages torque of the conduits 20 as the conduits 20 are pulled and pushed through the center hole 68 and the center of the funnel 70 of the receiving disc 58.

Figure 12:
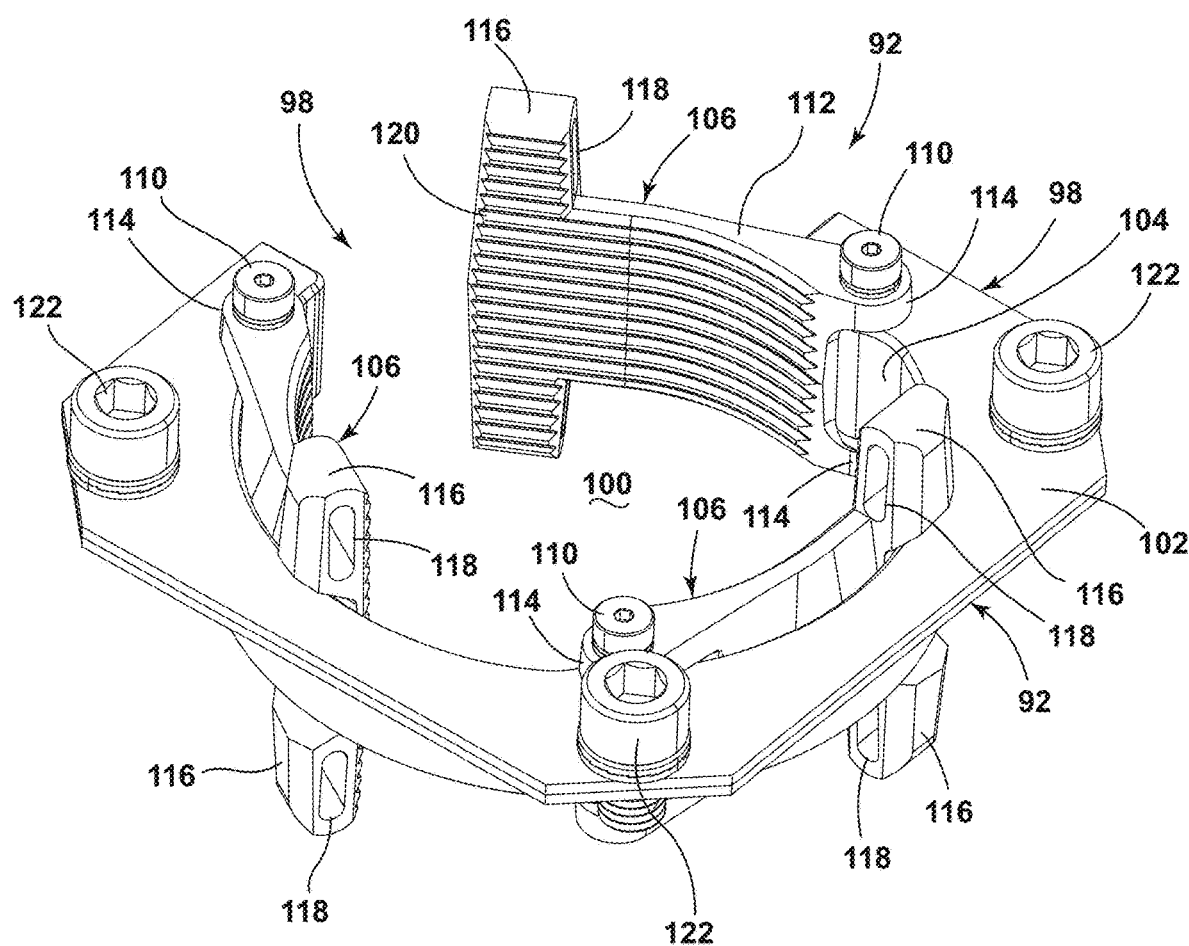
FIG. 12 is a perspective view of a grip member of the cinch plate according to an embodiment.

The illustrated cinch plate 90 may include a grip member 92 and a plurality of fastening bands 94. The fastening bands 94 apply force to the grip member 92 to ensure the grip member 92 securely grips the conduits 20. The grip member 92 includes a C-shaped member 96 with a side opening 98 (see FIG. 12). The side opening 98 allows the conduits 20 to be inserted into a center area 100 of the C-shaped member 96. The C-shaped member 96 includes a C-shaped plate 102 and a C-shaped flange 104 extending downwardly from the C-shaped plate 102 adjacent the center area 100. A plurality of grip paddles 106 are pivotally connected to the C-shaped member 96 by a pivot pin 110 that extends through the C-shaped plate 102 and an opening in the C-shaped flange 104. Each grip paddle 106 is configured to close upon the conduits 20 to securely grip the conduits 20. Each grip paddle 106 is T-shaped and includes a main body 112, a pair of pivot ears 114 at a first end of the main body 112 and a pair of band receivers 116 extending laterally from the main body 112 at a second end thereof. The pivot ears 114 straddle the C-shaped member 96 and the pivot pin 110 extend first through one pivot ear 114, the C-shaped member 96 and then the other pivot ear 114. The grip paddle 106 is therefor able to pivot toward and away from a center of the center area 100 as shown in FIG. 12. Each of the band receivers 116 includes a central opening 118 having an axis substantially perpendicular to the axis of the pivot pin 110.

Figure 9:
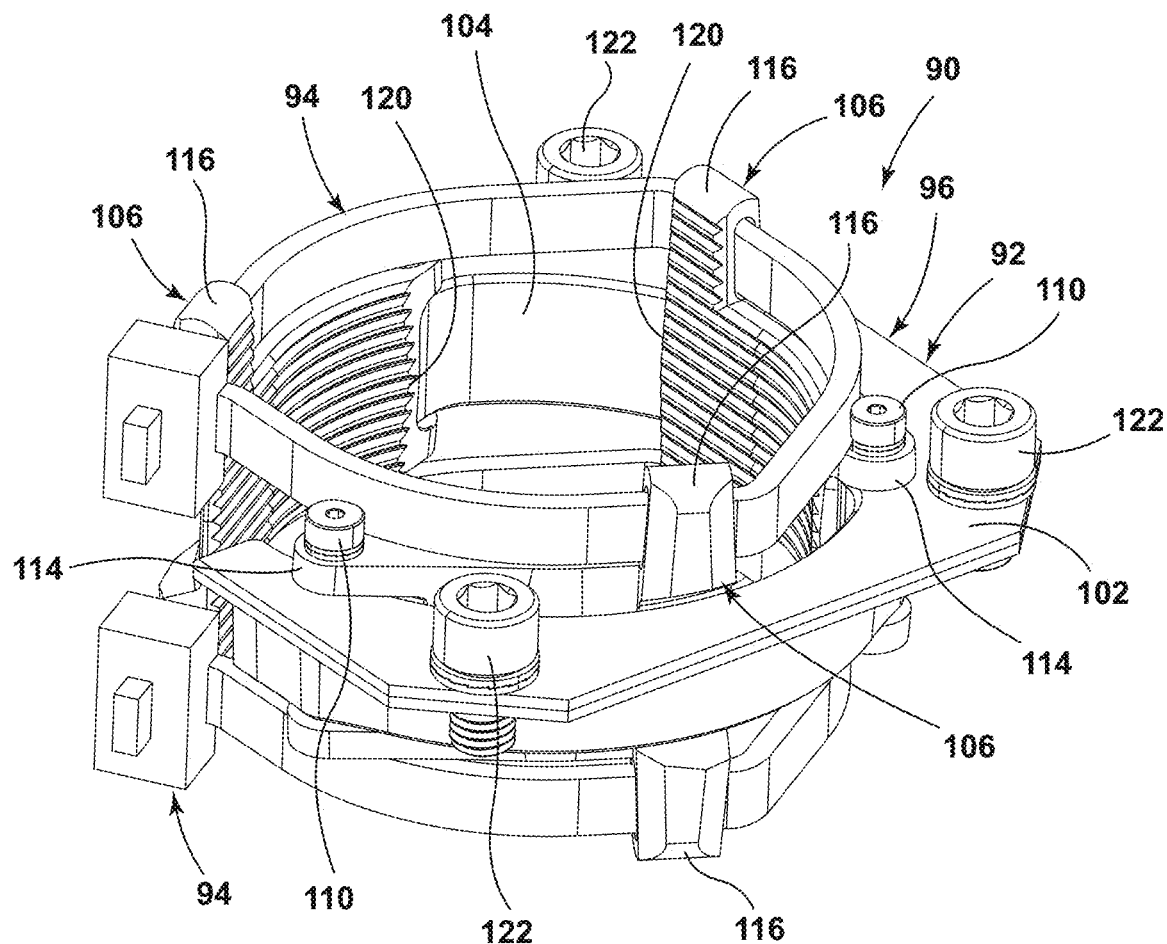
FIG. 9 is a perspective view of the cinch plate according to an embodiment.
Figure 10:
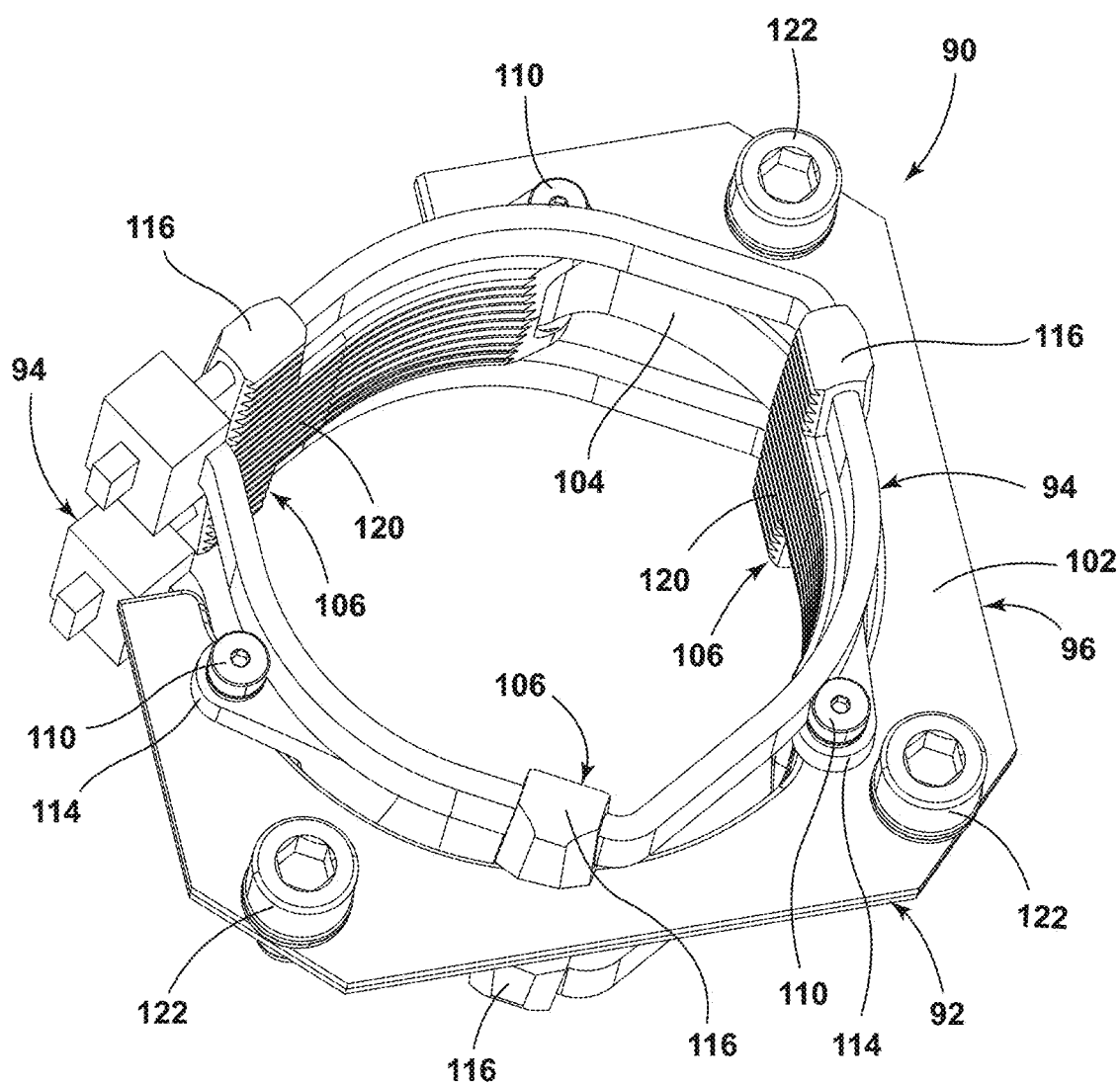
FIG. 10 is a top perspective view of the cinch plate according to an embodiment.
Figure 11:
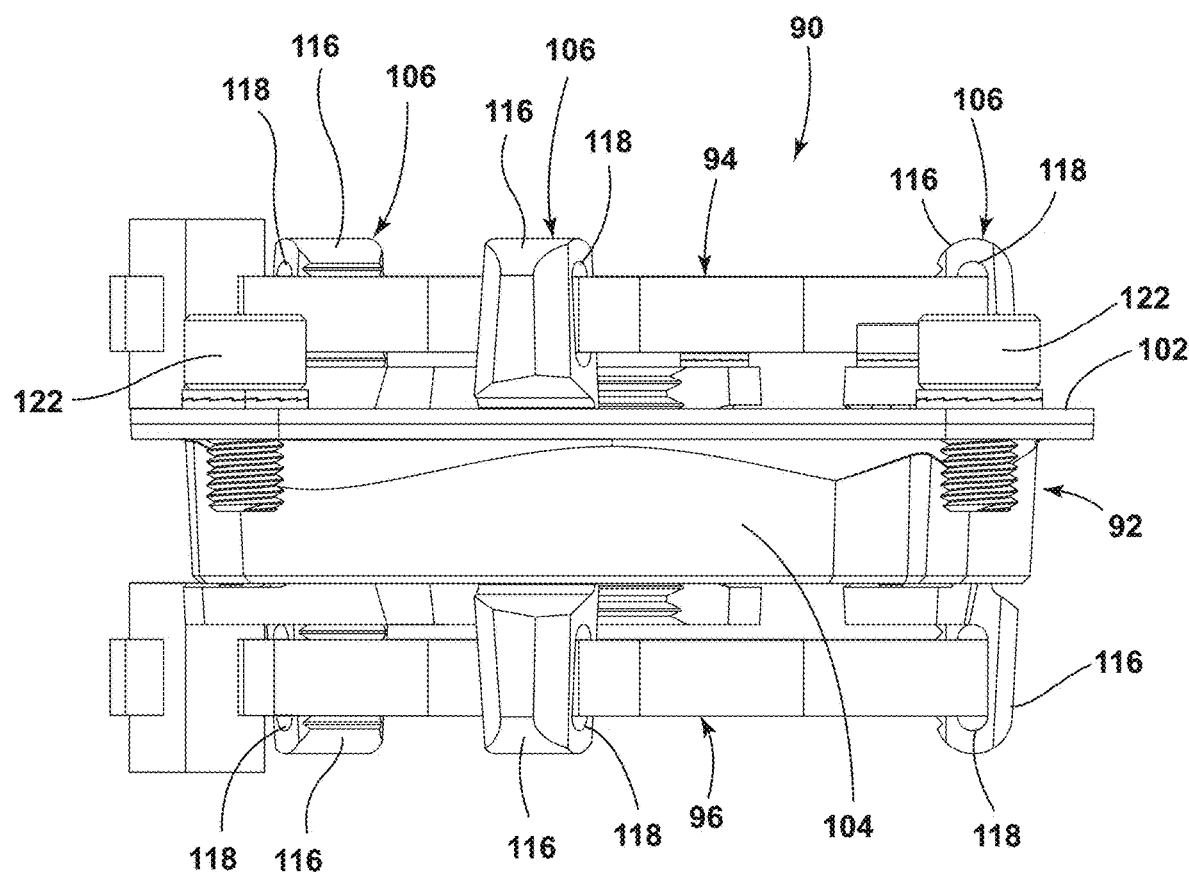
FIG. 11 is a side view of the cinch plate according to an embodiment.

As shown in the embodiment of FIGS. 9-11, a first fastening band 94 extends through all of the central openings 118 in the band receivers 116 of the grip paddles 106 on a first side of the C-shaped member 96 and a second fastening band 94 extends through all of the central openings 118 in the band receivers 116 of the grip paddles 106 on a second side of the C-shaped member 96. The fastening bands 94 (e.g., a zip tie or a Velcro® strap) can be selectively tightened to close the area of the center area 100 to thereby securely capture the conduits 20 within the cinch plate 90. An interior face of each grip paddle 106 includes a plurality of ridges 120 to assist in securely gripping the conduits 20. Although a particular cinch plate 90 is shown, it is contemplated that other members could be used that grab and hold the conduits 20 in the same location as the described cinch plate 90. Moreover, it is contemplated that any number of grip paddles 106 could be used and the grip paddles 106 could be biased inwardly in any fashion (e.g., using torsional springs wrapped about the fasteners 110 or the grip paddles 106 could be configured to move linearly with a spring forcing the grip paddles 106 inwardly and away from the C-shaped member 96).

Figure 4:
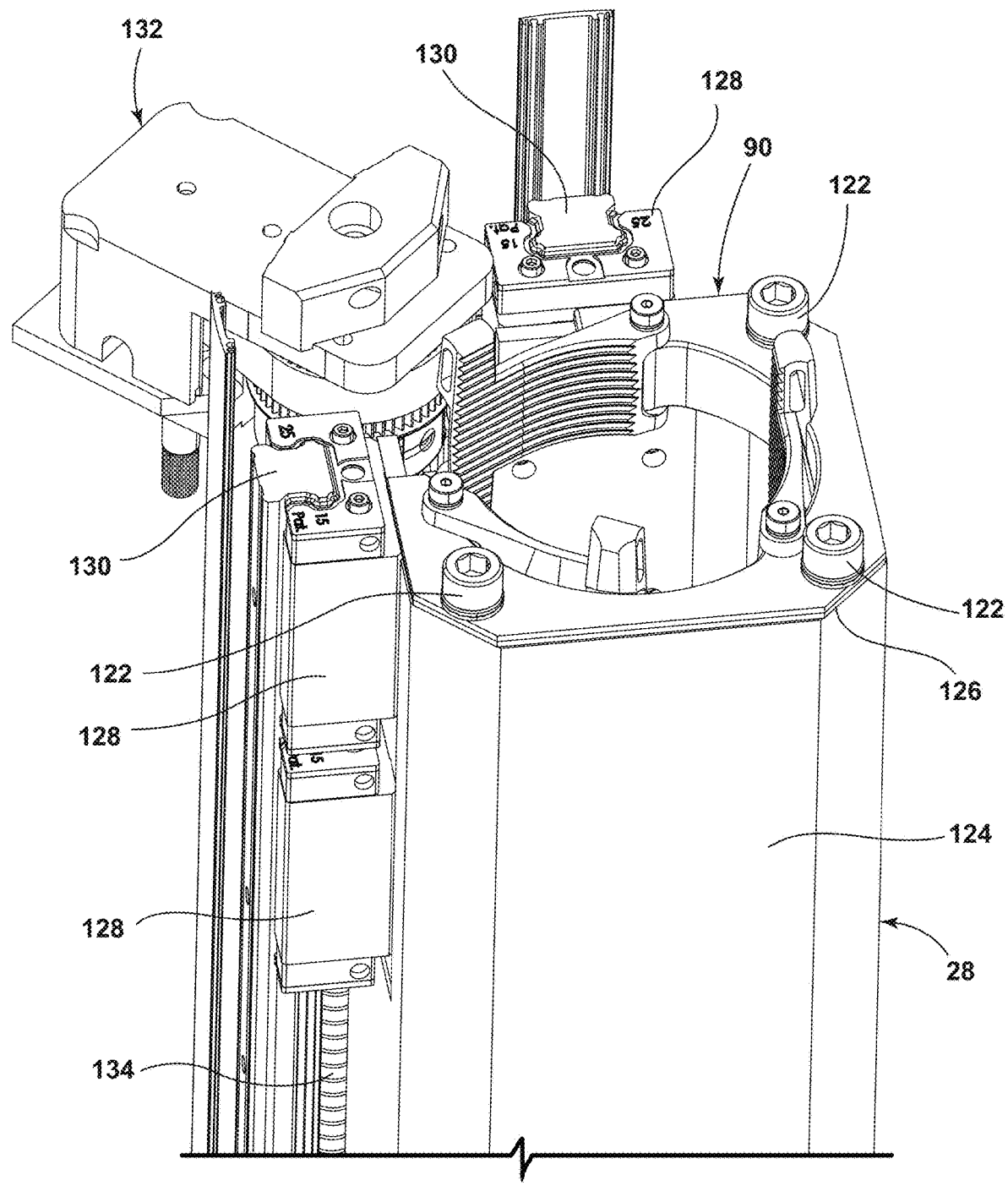
FIG. 4 is a partial top perspective view of a cinch plate connected to an inner telescoping tube of a vertically adjustable column of the suspension arm assembly according to an embodiment.
Figure 5:
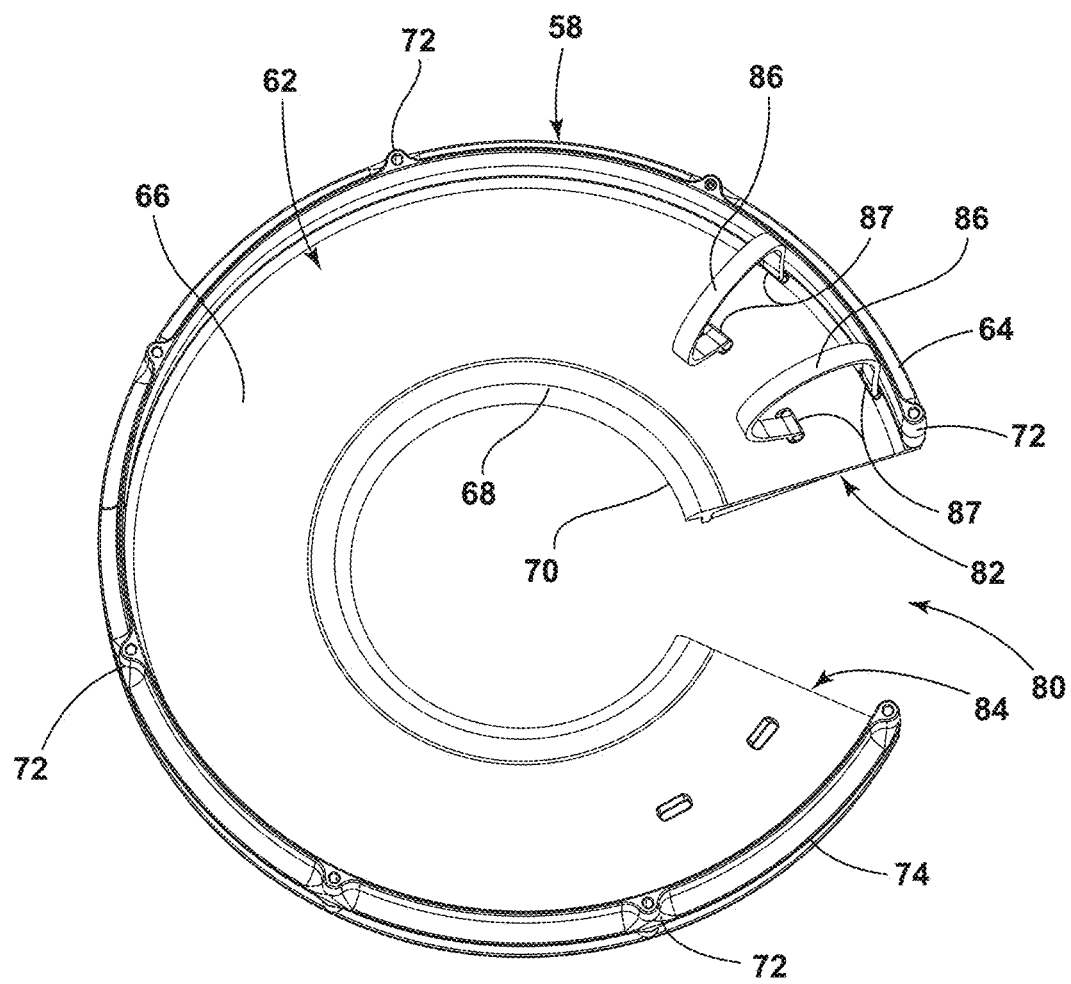
FIG. 5 is a top view of a receiving disc of the top pod according to an embodiment.

In the illustrated example, the cinch plate 90 grips the conduits 20 and moves the conduits 20 at the point captured therein with movement of the vertically adjustable column 22. As illustrated in FIG. 4, the cinch plate 90 is connected to a top 126 of the inner telescoping tube 28 of the vertically adjustable column 22. For example, the cinch plate 90 could be connected to the top 126 of the inner telescoping tube 28 by fasteners 122 that extend through the C-shaped plate 102 of the grip member 92 and into the top 126 of the inner telescoping tube 28. It is contemplated that the cinch plate 90 could be fixed in position at any location in the inner telescoping tube 28 (e.g., at the top, at the bottom or any location therebetween) or could be fixed in position and to the service head 18.

As shown in FIGS. 6-8, the conduits 20 may include a bundle retainer 200 for keeping all of the conduits 20 in a manageable bundle between the straps 86 of the receiving disc 58 of the top pod 24 and the cinch plate 90. The bundle retainer 200 can be any device that surrounds the conduits 20 at one or multiple locations. As illustrated in FIGS. 6-8, the bundle retainer 200 includes a backbone retainer linkage 202 that extends substantially parallel with the conduits 20 and a plurality of boundary bands 204. The backbone retainer linkage 202 extends from the straps 86 to the cinch plate 90. It is contemplated that the backbone retainer linkage 202 can be attached to both the straps 86 and the cinch plate 90, only one of the straps 86 and the cinch plate 90, or neither the straps 86 nor the cinch plate 90. The boundary bands 204 surround the conduits 20 and are configured to securely grip the conduits 20 about a periphery thereof. The boundary bands 204 can be zip ties, Velcro® straps or any other connector that connects to the backbone retainer linkage 202 and securely captures the conduits 20 therein. The bundle retainer 200 can assist in preventing chaffing and/or snagging of the conduits 20 during extension and contraction of the vertically adjustable column 22.

The illustrated cinch plate 90 and conduits 20 gripped therein are moved vertically within the vertically adjustable column 22 to raise and lower the conduits 20 with the service head 18 without tangling or applying undue torque to the conduits 20. The cinch plate 90 can be raised and lowered by any means. In the illustrated example, the cinch plate 90 is raised and lowered with the inner telescoping tube 28. As illustrated in FIG. 4, the inner telescoping tube 28 includes a plurality of aligned carriage bearings 128 on an exterior face 124 of the inner telescoping tube 28. Each set of aligned carriage bearings 128 accept a rail 130 connected to an interior surface of the outer telescoping tube 30. As the inner telescoping tube 28 moves within the outer telescoping tube 30, each set of the aligned carriage bearings 128 slide along the rail 130. Although FIG. 4 illustrates two sets of aligned carriage bearings 128 and two rails 130, it is contemplated that any number of sets of aligned carriage bearings 128 and associated rails 130 could be used. Any manner could be used to telescope the inner telescoping tube 28 within the outer telescoping tube 30. For example, as shown in FIG. 4, a rotary gear system 132 could be connected to the outer telescoping tube 30, with the rotary gear system 132 rotating a threaded rod 134 that rotates within and moves the aligned carriage bearings 128 connected to the inner telescoping tube 28 to move the inner telescoping tube 28 vertically. The inner telescoping tube 28 could be held in position within the outer telescoping tube 30 in any manner (e.g., using slider collar bearings, etc.) It is contemplated that any other linear actuator connected to the inner telescoping tube 28 and the outer telescoping tube 30 could be used (e.g., a hoist, a cable/strap system, etc.).

Figure 20:
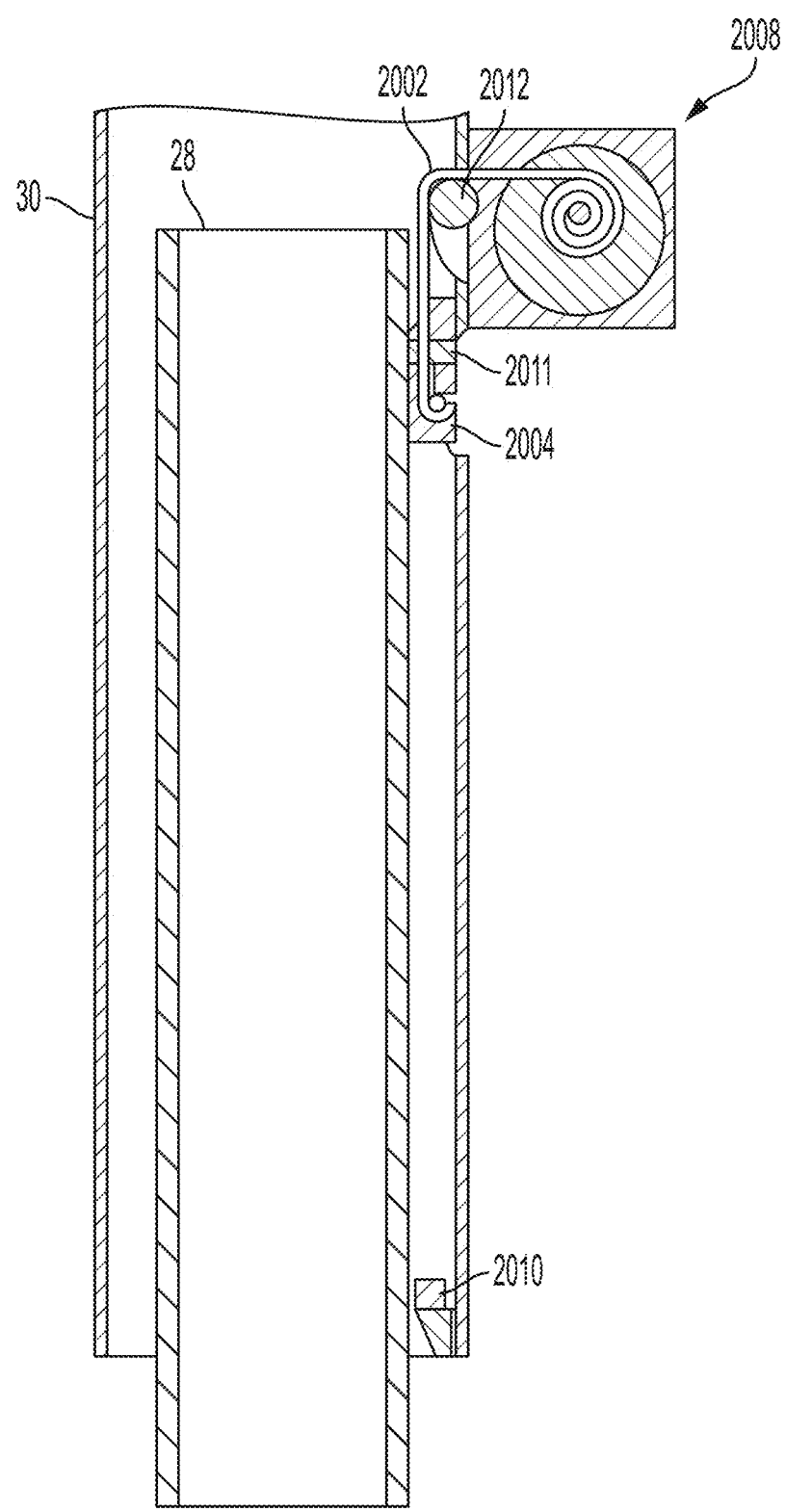
FIG. 20 illustrates a mechanism for telescoping the inner telescoping tube within the outer telescoping tube, according to some embodiments.

FIG. 20 illustrates another embodiment for telescoping the inner telescoping tube 28 within the outer telescoping tube 30. In the illustrated embodiment, a hoist arrangement is used to raise and lower the inner telescoping tube 28. A strap 2002 attaches to a block 2004 adjacent an upper end of the inner telescoping tube 28. The strap 2002 extends vertically and then around a pulley 2012 to a hoist 2008, which winds and unwinds the strap 2002 to raise and lower, respectively, the inner telescoping tube 28. The hoist 2008 can include any suitable rotatory motor, such as a stepper motor, servo motor, brushless DC motor, etc., which can be powered via a power line extending within the conduits 20. In some embodiments, the hoist 2008 includes a transmission.

According to some embodiments, a lower stop 2010 and an upper stop 2011 are provided to limit the retraction and extension of the inner telescoping tube 28. In some embodiments, the stops 2010 and 2011 contact the block 2004 to limit the travel of the inner telescoping tube 28. In some embodiments, the hoist 2008 can sense when the inner telescoping tube 28 has hit a travel limit, such as when the inner telescoping tube 28 has hit a stop 2010, 2011 or when movement of the inner telescoping tube 28 is otherwise restricted. For example, the hoist 2008 can include a torque sensor for sensing the torque on the hoist 2008, which can be compared to one or more predetermined values to determine that the travel of the inner telescoping tube 28 has ceased or is otherwise restricted. For example, when the inner telescoping tube 28 hits a lower stop or impacts an external object, such as a table, the strap 2002 may slacken, reducing the torque on the hoist 2008, which is sensed by the torque sensor. Conversely, when the inner telescoping tube 28 hits an upper stop or its upward movement is otherwise restricted (e.g., a weight has been added that is above a predetermined limit), the torque sensor may sense an increase in the torque above a predetermined limit. When the torque sensor senses a torque that is too high and/or too low, the hoist 2008 may cease winding and/or unwinding the strap 2002.

Figure 21A:
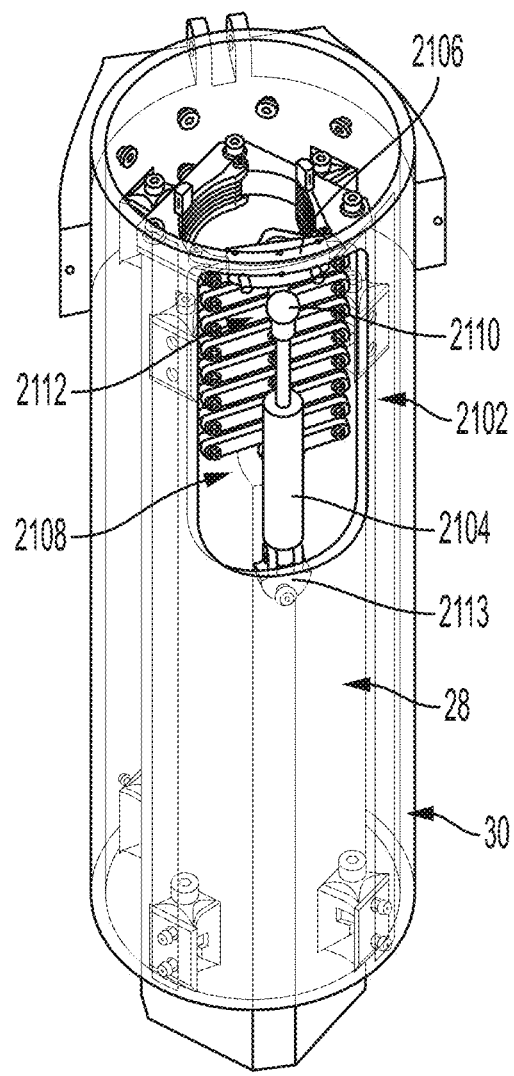
FIGS. 21A-B illustrate a mechanism for telescoping the inner telescoping tube within the outer telescoping tube, according to some embodiments.
Figure 21B:
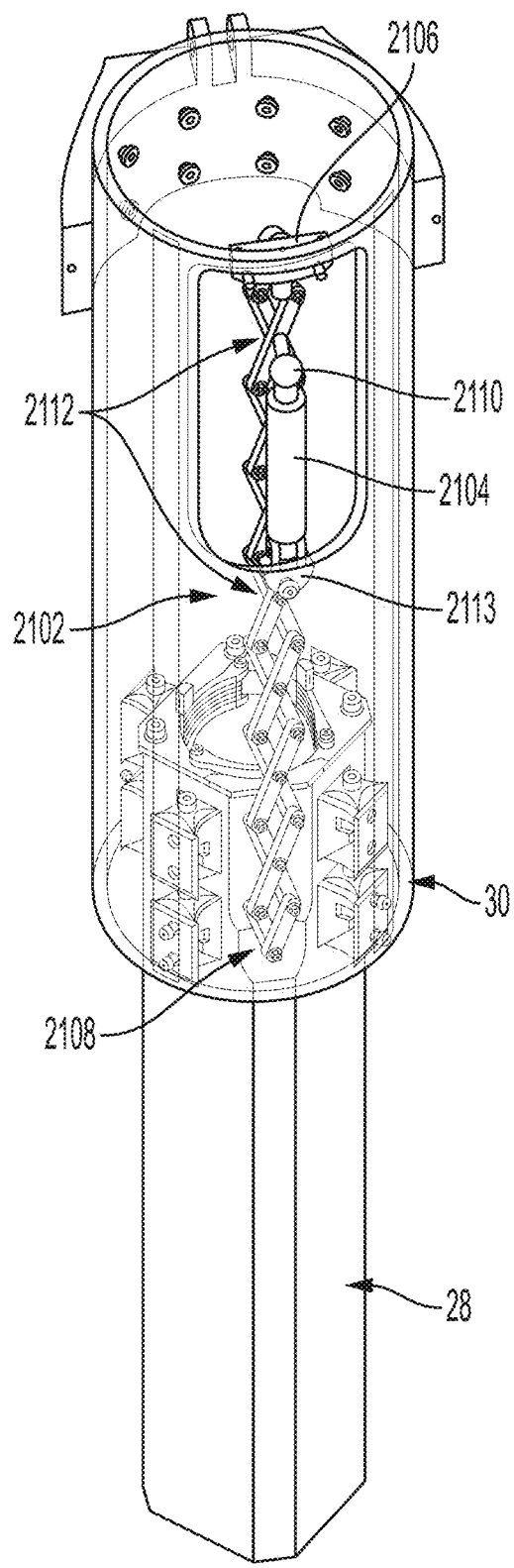

FIGS. 21A-B illustrate another embodiment for telescoping the inner telescoping tube 28 within the outer telescoping tube 30. In the illustrated embodiments, a scissor mechanism 2102 is used to amplify the stroke of a linear actuator 2104 so that a relatively large translation of the inner telescoping tube 28 can be achieved with a relatively short linear actuator 2104. For example, the translation of the inner telescoping tube 28 can be 2×, 4×, 8×, 10×, etc., of the stroke of the linear actuator 2104. According to some embodiments, incorporating the scissor mechanism 2102 enables a more compact telescoping mechanism.

According to some embodiments, an upper end 2106 of the scissor mechanism 2102 is attached to the outer telescoping tube 30 and a lower end 2108 of the scissor mechanism 2102 is attached to the inner telescoping tube 28. One end 2110 of the linear actuator 2104 can be attached to one or more of the pivot joints 2112 of the scissor mechanism 2102 and the other end 2113 can be attached to the outer telescoping tube 30. Extending the linear actuator 2104 collapses the scissor mechanism 2102, which causes the inner telescoping tube 28 to retract (FIG. 21A illustrates the retracted position). Contraction of the linear actuator 2104 extends the scissor mechanism 2102, which causes the inner telescoping tube 28 to extend, as shown in FIG. 21B. The linear actuator can be oriented in the manner illustrated in FIGS. 21A-B or can be oriented in the opposite manner. In some embodiments, the extension of the inner telescoping tube 28 is passive, with the weight of the inner telescoping tube 28 causing the scissor mechanism to extend and the linear actuator to collapse. The linear actuator 2104 can be, for example, a gas spring, a linear ball screw, a lead screw, a rack and pinion, or any other suitable linear actuator. The linear actuator 2104 can be powered or passive.

Figure 22A:
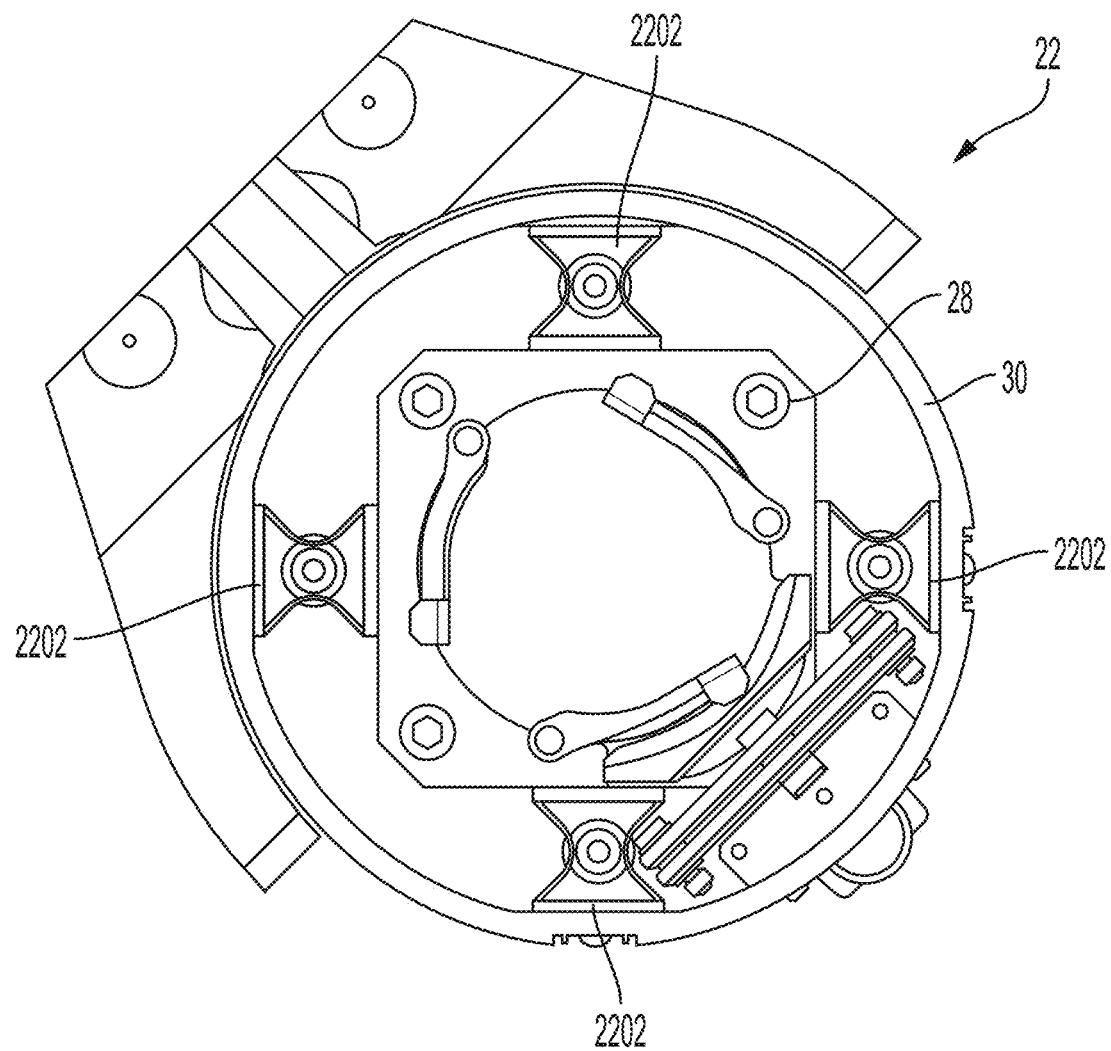
FIG. 22A illustrates a linear bearing arrangement for guiding telescopic movement of the inner telescoping tube within the outer telescoping tube, according to some embodiments.

FIG. 22A illustrates a linear bearing arrangement for guiding telescopic movement of the inner telescoping tube 28 within the outer telescoping tube 30. FIG. 22A is a view through the center of the vertically adjustable column 22. In the illustrated embodiment, a plurality of radially spaced linear bearings 2202 are positioned between the inner telescoping tube 28 and the outer telescoping tube 30. Each bearing 2202 can be attached to either the inner telescoping tube 28 or the outer telescoping tube 30 and slidably engages with the other of the inner telescoping tube 28 or the outer telescoping tube 30. In various other embodiments, any number of bearings may be used.

Figure 22B:
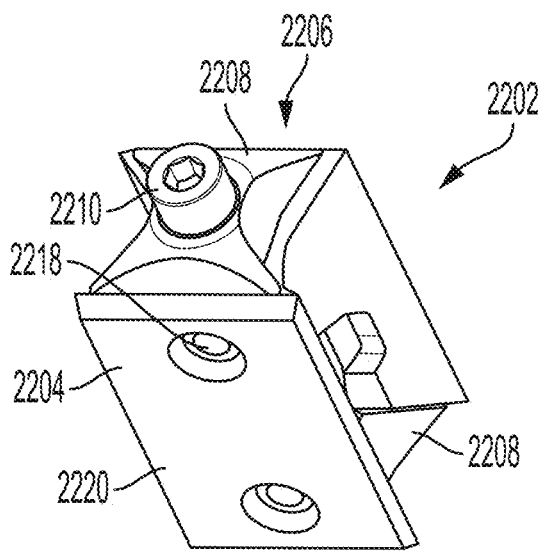
FIG. 22B is a perspective view of a linear bearing and FIGS. 22C and 22D are cross sections of the bearing, according to some embodiments.
Figure 22C:
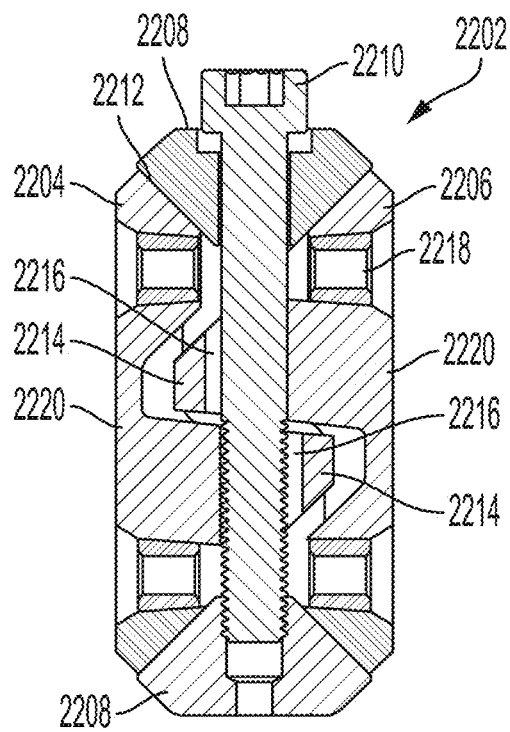
Figure 22D:
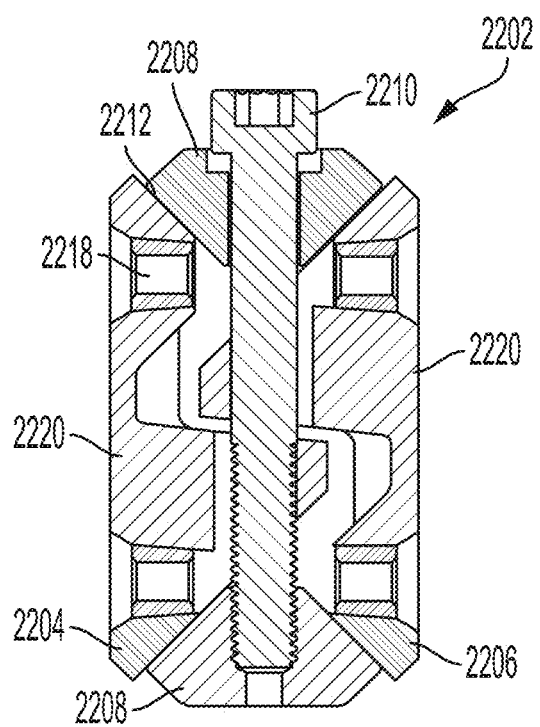

The bearings 2202 are adjustable in thickness so that the bearings 2202 can be adjusted to fit the space between the inner telescoping tube 28 and/or the outer telescoping tube 30 and/or to provide preloading between the two tubes to control the stiffness of the column 22. FIG. 22B is a perspective view of a bearing 2202 and FIGS. 22C and 22D are cross sections of the bearing 2202, according to some embodiments. The bearing 2202 includes first and second support pieces 2204 and 2206 that may each have a bearing face 2220 that is configured for bearing on the respective inner and outer telescoping tube 28, 30. Two wedge members 2208 are located at opposite ends of the support pieces 2204, 2206. A tensioner 2210 bridges the wedge members 2208 to control the locations of the wedge members 2208 relative to one another. In the illustrated embodiment, the tensioner 2210 is a bolt. In other embodiments, the tensioner may be a strap or tie that can pull the wedge members 2208 together. The wedge members 2208 wedge against ramped surfaces 2212 of the support pieces 2204, 2206. Upon pulling the wedge members 2208 together using the tensioner 2210, the wedge members 2208 force the support pieces 2204, 2206 apart from one another, increasing the thickness of the bearing 2202. Thus, the bearing 2202 is adjustable in thickness. Each support piece 2204, 2206 can include a retainer 2214 that is configured to retain the support piece in the assembly. In the illustrated embodiment, the retainer 2214 is a central projection that includes an aperture 2216 through which the tensioner 2210 extends. The aperture 2216 is larger in size that the tensioner 2210 so that the support piece 2204, 2206 can move laterally with respect to the tensioner 2210.

One or both of the support pieces 2204, 2206 can be configured for attachment to the inner telescoping tube 28 or the outer telescoping tube 30, such as by using one or more bolts threaded into threaded holes 2218, and one or both support pieces can be configured for sliding engagement with the inner telescoping tube 28 or the outer telescoping tube 30. In some embodiments, the support pieces 2204, 2206 are identical, which can help reduce manufacturing costs and help prevent mis-assembly of the bearings 2202 in the vertically adjustable column 22. One or both of the support pieces 2204, 2206 can be a wearable component or have a wearable bearing face 2220 that is designed to wear over time while preventing wear of the tube on which its bears. As the support piece wears over time, the bearing can easily be adjusted via the tensioner 2210, as discussed above, to account for the reduction in thickness due to wear.

At least one bearing 2202 can be assembled between the inner and outer telescoping tubes 28, 30 to fill the gap therebetween. The adjustable nature of the bearing 2202 can mean that shimming is not required to make up for assembly tolerances since the bearing 2202 can be configured to be adjustable enough to make up for assembly tolerances. Further, as the bearing 2202 wears during operation, the bearing 2202 can be adjusted to make up for the "slop" that can develop over time. Further, the bearing can be adjusted to set the preload of the bearing to control stiffness of the column 22.

According to some embodiments, use of the bearings 2202 in the vertically adjustable column 22 provides a number of advantages. For one, the adjustable nature of the bearings 2202 means that extremely tight tolerances are not needed, which can serve to drive down manufacturing costs significantly. Additionally, the bearings 2202 result in solely compression loading of the bearings, which is advantageous over shear and tension loads that can develop in conventional jacking screws. Further, according to various embodiments, the bearings eliminate the need for shimming, which can oftentimes be a very time-consuming, laborious process that does not always remove slop from the system. Manufacturing costs and complexity are further reduced by the relatively simple construction of the bearings 2202, which can be configured such that several instances of the same part are used for each bearing 2202, thereby reducing individual part cost.

The bearing 2202 can be any suitable shape. The bearing 2202 in the illustrated embodiment can having flat bearing faces 2220 that are parallel to one another, which can prevent relative rotation between the inner and outer telescoping tubes 28, 30. In various other embodiments, the bearing 2202 can be other shapes and having other bearing face shapes. For example, one or more bearing faces 2220 can have a curved profile so that the inner and outer telescoping tubes 28, 30 can rotate relative to one another.

The illustrated service head 18 can be connected to the vertically adjustable column 22 in any manner. As illustrated in FIG. 1, the illustrated embodiment of the outer telescoping tube 30 of the vertically adjustable column 22 includes an angled bottom collar 230 have an opening in the center thereof corresponding to an outside shape of the inner telescoping tube 28 (e.g., square as illustrated or any other shape). The inner telescoping tube 28 slides into and out of the outer telescoping tube 30 through the opening in the angled bottom collar 230. It is contemplated that alternately covers (e.g., bellows) between the service head 18 and the vertically adjustable column 22 could be used.

Moreover, it is contemplated that the service head 18 could be fixed or rotatably connected to a bottom of the vertically adjustable column 22. If the service head 18 is rotatably connected to the vertically adjustable column 22, the service head 18 could be rotatably connected to the inner telescoping tube 28. If the service head 18 does not have gas supplied thereto through the conduits 20, it is contemplated that the rotary connection could include a slip ring or an infinite rotation fiber optic and slip ring rotary joint, such as that described in U.S. Patent Application Publication No. 2018/0017736 entitled SEPARABLE INFINITE ROTATION FIBER OPTIC AND SLIP RING ROTARY JOINT FOR SUSPENSION ARM, the entire contents of which are hereby incorporated herein by reference. It is contemplated that a brake system could be used to selectively prevent rotation of the service head 18 relative to the vertically adjustable column 22.

Such rotary connection could also be limited to prevent free unlimited rotation of the service head 18. For example, the rotary connection could include at least one stop for preventing more than 360° of rotation. Alternatively, the rotary connection could include a system that allows for more than 360° of rotation, but still limits full unlimited rotation. Examples of such rotary connections are discussed in U.S. Pat. No. 9,945,498 entitled MULTI-STAGE ROTARY OVERTRAVEL STOP, the entire contents of which are hereby incorporated herein by reference.

Figure 13:
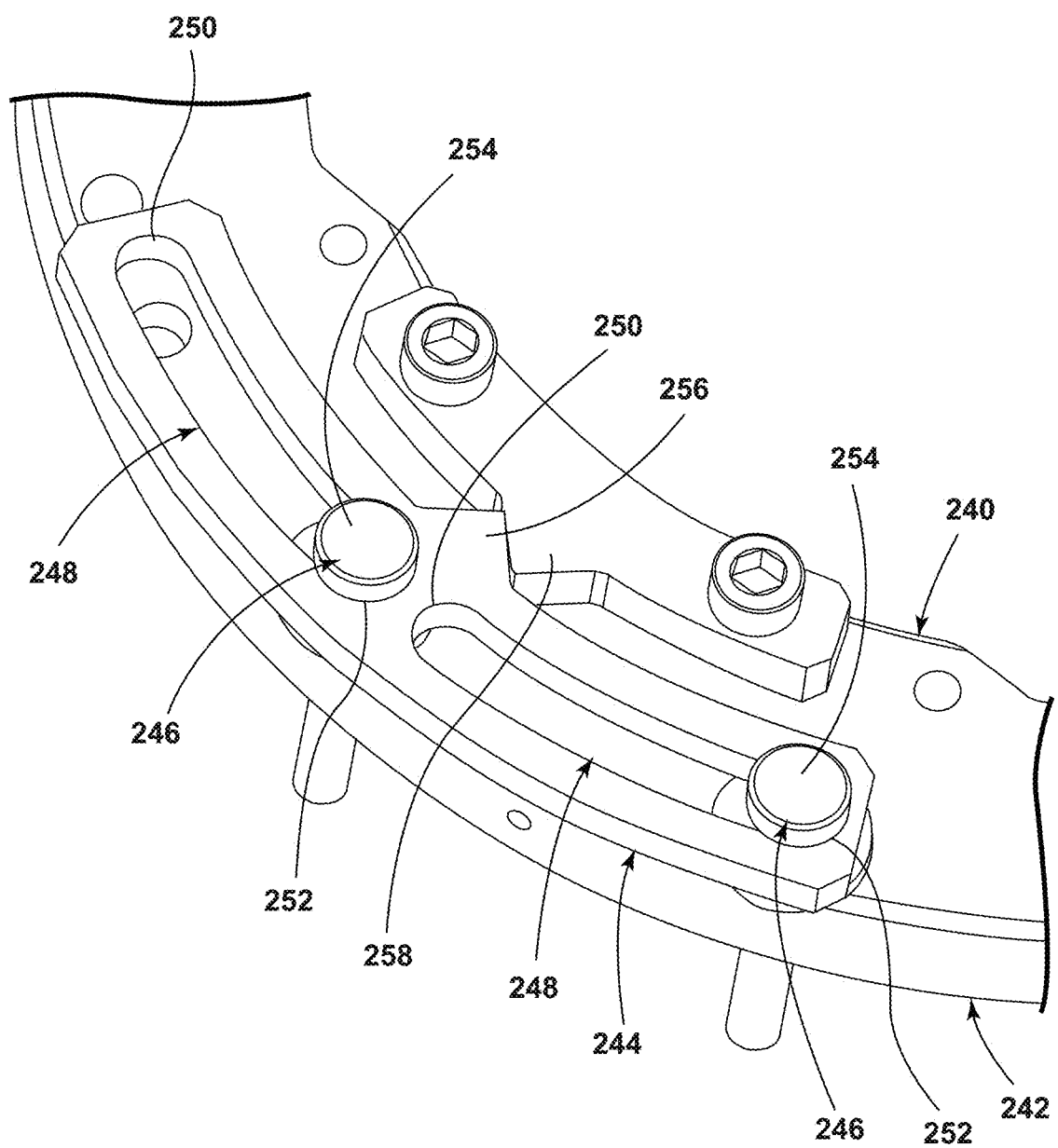
FIG. 13 is a partial perspective view of a rotary connection according to an embodiment.

FIG. 13 illustrates another possible rotary connection between the service head 18 and the vertically adjustable column 22. As illustrated in FIG. 13, a first one of the service head 18 and the vertically adjustable column 22 includes an inner rotating disc 240 and a second one of the service head 18 and the vertically adjustable column 22 includes an outer rotating disc 242 surrounding the inner rotating disc 240. The inner rotating disc 240 and the outer rotating disc 242 could be translationally fixed relative to each other (not shown) and allowed to rotate relative to each other. An idler member 244 is located between the inner rotating disc 240 and the outer rotating disc 242 to limit relative rotation thereof. As shown in FIG. 13, the outer rotating disc 242 includes a plurality of pins 246 that extend through arcuate slots 248 in the idler member 244. The idler member 244 can move relative to the outer rotating disc 242 by allowing the pins 246 to slide within the slots 248 from a first end 250 of the slots 248 to a second end 252 of the slots 248. The pins 246 include enlarged heads 254 to maintain the pins 246 within the slots 248. While two pins 246 and slots 248 are shown, any number of pins 246 and slots 248 could be used (including one of each).

FIG. 13 illustrates the outer rotating disc 242 at a first fully rotated position. In the first fully rotated position, a projection 256 extending radially inwardly from the idler member 244 abuts a fixed abutment 258 connected to the inner rotating disc 240. As the outer rotating disc 242 is rotated, the pins 246 will move from the second end 252 to the first end 250 of the slots 248 either through relative movement of the idler member 244 and the outer rotating disc 242 or because the projection 256 of the idler member 244 rotates about 360° and abuts the other side of the fixed abutment 258 (or both). While the idler member 244 is only allowed to rotate about 360°, the slots 248 allow the outer rotating disc 242 to rotate an additional amount corresponding to the arcuate length of the slots 248. Accordingly, the service head 18 has a range of rotation relative to the vertically adjustable column 22 that is greater than 360°. While the idler member 244 is shown connected to the outer rotating disc 242 and the fixed abutment 258 is shown as being connected to the inner rotating disc 240, such position can be reversed with the idler member 244 being connected to the inner rotating disc 240 and the fixed abutment 258 being connected to the outer rotating disc 242.

Figure 14:
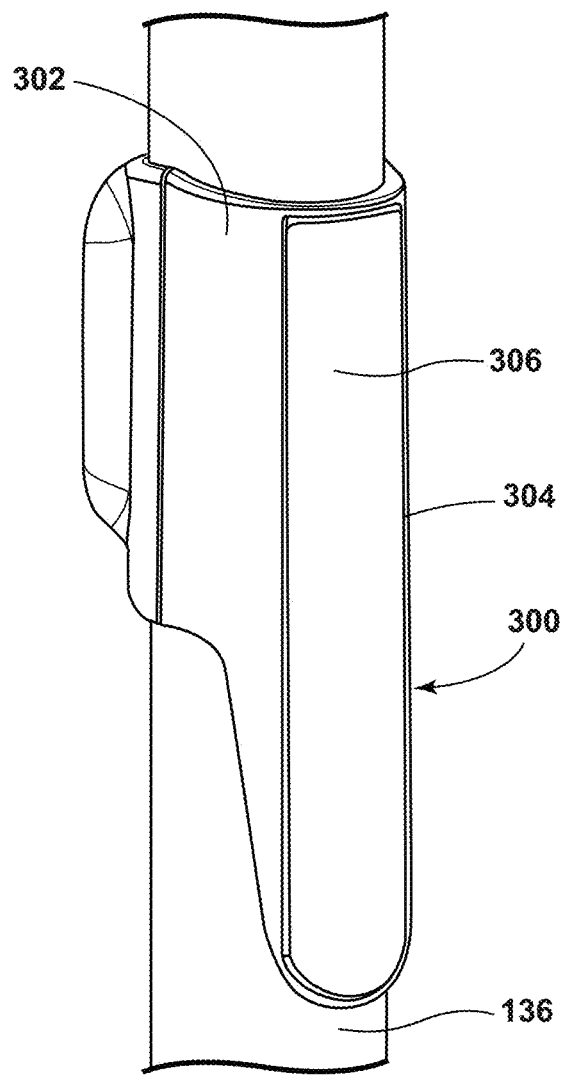
FIG. 14 is a partial view of a rail and a front view of a handle for moving the service head according to an embodiment thereof.
Figure 15:
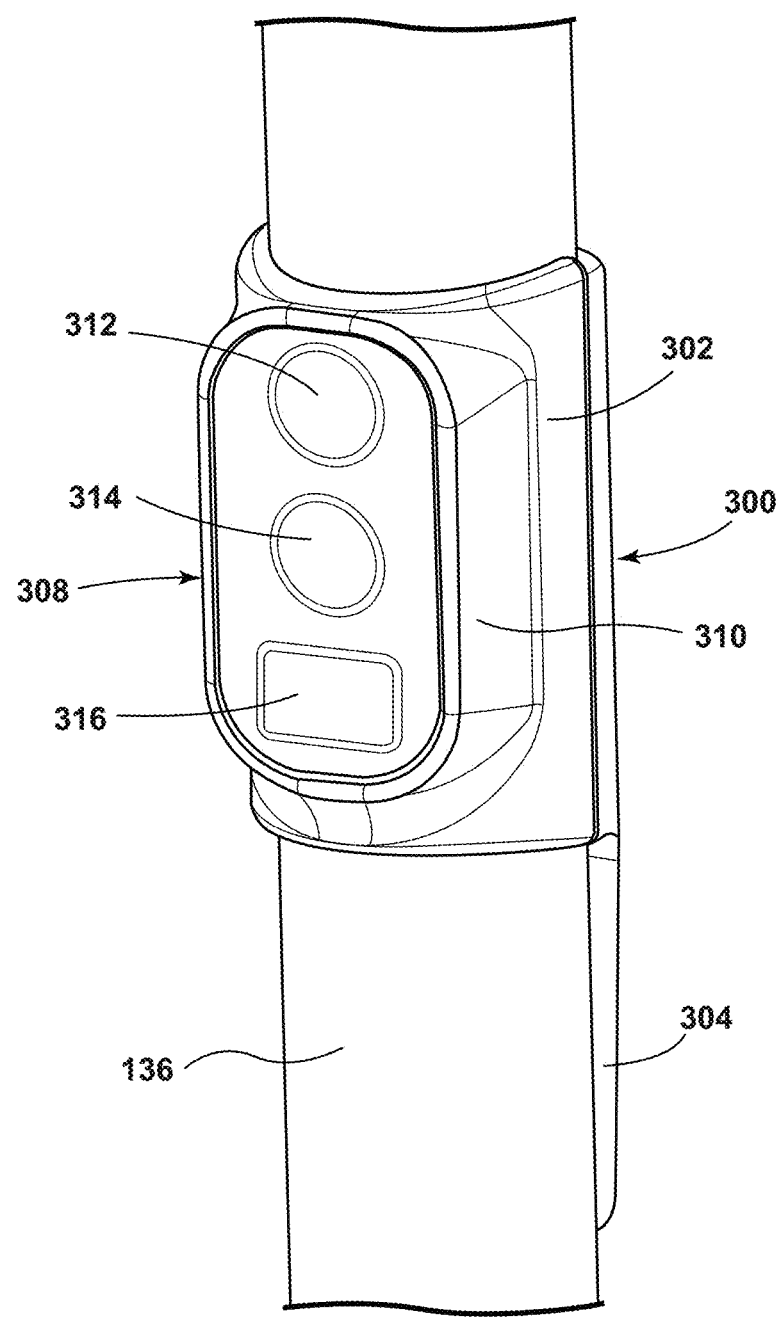
FIG. 15 is a partial view of the rail and a rear view of the handle for moving the service head according to an embodiment thereof.

In the illustrated example, the service head 18 can include at least one gripping element (e.g., vertically extending rails 136) for adjusting the location of the service head 18 horizontally by altering the position of the suspension arm 14. The service head 18 can include a button, a capacitive sensor, a proximity switch/sensor (or similar) (e.g., on the paddles 136) that is depressed or touched to allow free movement of the suspension arm 14 and/or the service head 18. For example, the service head 18 can include a handle 300 (see FIGS. 1, 14 and 15) connected to one of the rails 136. The handle 300 can include an encircling portion 302 for surrounding one of the rails 136 and a grip portion 304 that extends from the encircling portion 302 (e.g., laterally, upward or downward as illustrated). The grip portion 304 can include a cover 306 that covers a button, a capacitive sensor or a proximity switch/sensor (or similar) such that grabbing the grip portion 304 unlocks all of the brakes of the suspension arm assembly 10 including brakes preventing arms or links of the suspension arm 14 from moving relative to each other and brakes preventing rotation of the service head 18 relative to the vertically adjustable column 22 (if used). Release of such brakes would allow full movement of the service head 18 horizontally. As illustrated in FIG. 15, the encircling portion 302 can include a movement pad 308 located in a sleeve 310 extending from a side of the encircling portion 302 opposite the grip portion 304. The movement pad 308 can include an up button 312 that is depressed for raising the service head 18 and a down button 314 for lowering the service head 18. The movement pad 308 can also include top brake button 316 that locks only the brake where the suspension arm 14 is rotatably connected to a ceiling (i.e., the top brake), thereby fixing the first link or arm of the suspension arm 14 in position by allowing the remaining links or arm to move. It is contemplated that the top brake button 316 will deactivate or activate the top brake when the top brake button 316 is depressed for a certain period of time.

Figure 16:
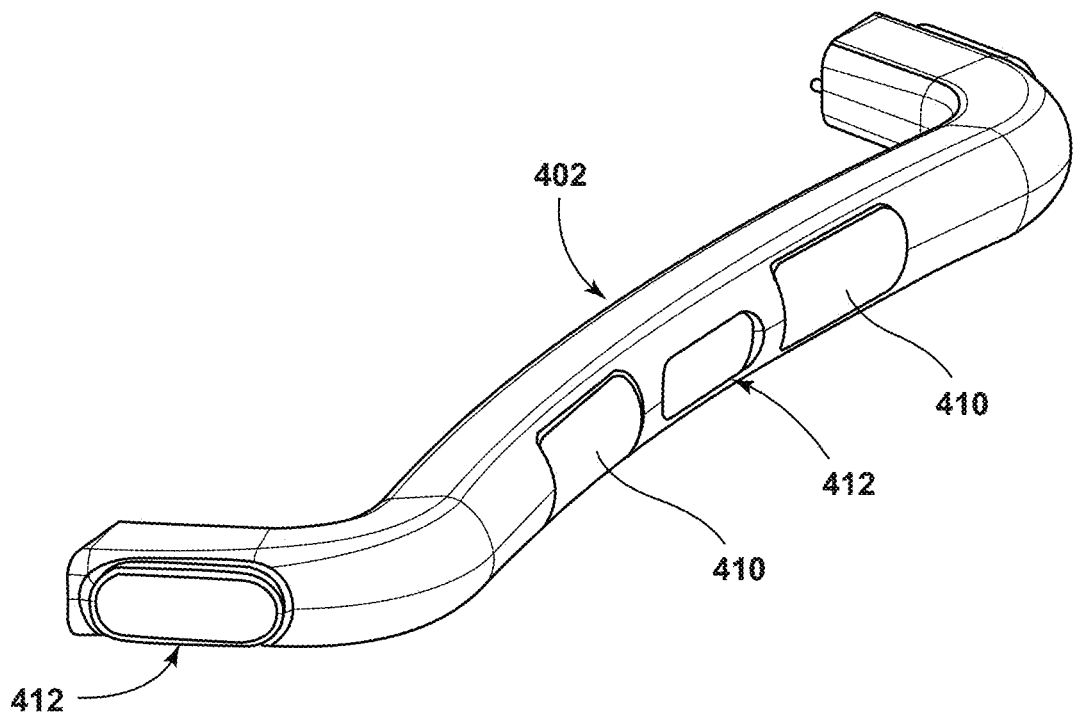
FIG. 16 is a front perspective view of a handle for moving the service head according to another embodiment thereof.
Figure 17:
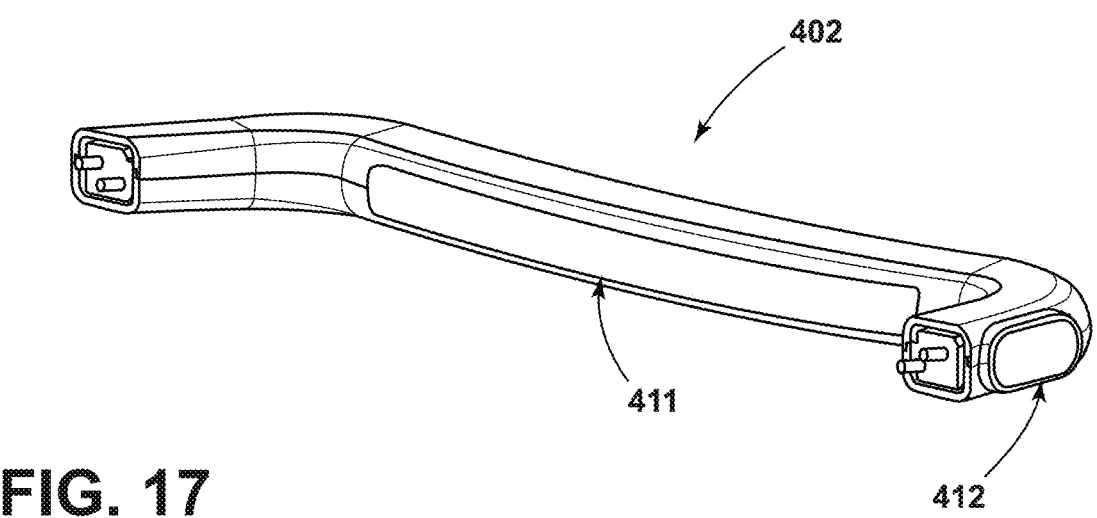
FIG. 17 is a rear perspective view of a handle for moving the service head according to another embodiment thereof.

As illustrated in FIGS. 1, 16 and 17, a horizontal shelf 400 could be connected to the rails 136. The shelf 400 can include a handle 402 extending from an end edge 404 thereof. It is contemplated that the shelf 400 could be fixed in location on the rails 136 or could be connected to a rail 408 having releasable clamps 406 that allow the shelf 400 to be raised and lowered. The handle 402 can include a plurality of front sensor pads 410 and a rear sensor pad 411 wherein grabbing at least one of the front sensor pads 410 and the rear sensor pad 411 depresses a button, a capacitive sensor, a proximity switch/sensor to release the brakes of the system in the same manner as grabbing the grip portion 304 of the handle 300 as outlined above. It is contemplated that a user of the suspension arm assembly 10 would need to simultaneously touch both at least one of the front sensor pads 410 and the rear sensor pad 411 to release the brakes as set forth in U.S. patent application Ser. No. 15/902,288 entitled MEDICAL MULTI-LINK BOOM, the entire contents of which are incorporated herein by reference. It is also contemplated that the handle 402 could include one or more movement pads 412. While three movement pads 412 are shown, any number of movement pads 412 could be used (including only one). The movement pads 412 can include an up button that is depressed for raising the service head 18 and a down button for lowering the service head 18 in the same manner as the movement pad 308 of the handle 300 as outlined above. Each movement pad 412 can also include a top brake button that functions identically to the top brake button 316 of the movement pad 308 of the handle 300 as outlined above. It is contemplated that a movement pad that includes a top brake button and a bottom brake button could be located at other areas of the service head 18 or at multiple areas on the service head 18.

It is also contemplated that the service head 18 could include a force sensor that detects when a force is applied to the service head 18 signifying that movement of the service head 18 is desired, thereby unlocking all joints of the suspension arm 14 and/or automatically activating the rotary gear system 132.

Figure 18A:
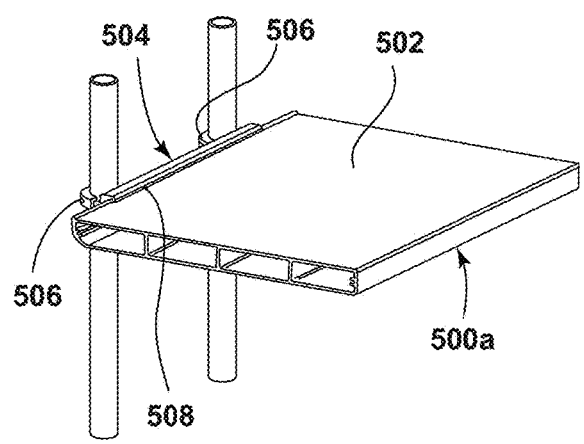
FIG. 18A is a front perspective view of a movable and removable shelf system for moving the service head according to an embodiment thereof.
Figure 18B:
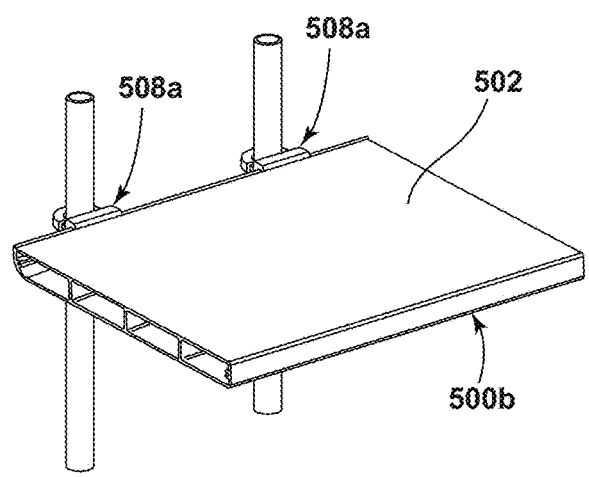
FIG. 18B is a front perspective view of a movable and removable shelf system for moving the service head according to another embodiment thereof.
Figure 19:
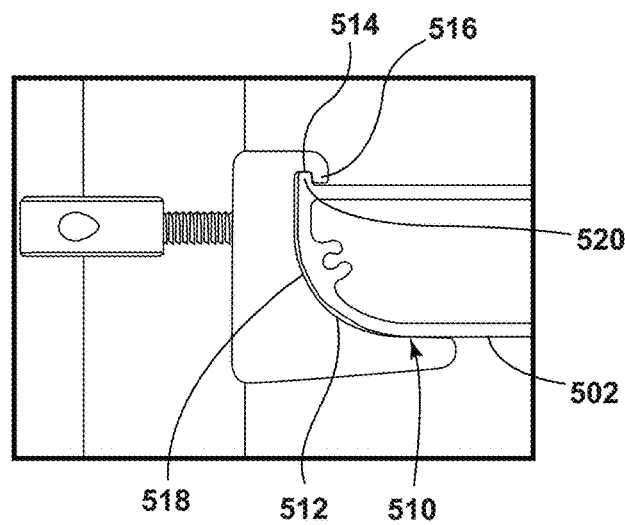
FIG. 19 is a cross-sectional view of a movable and removable shelf system for moving the service head according to an embodiment thereof.

FIG. 18A illustrates a movable and removable shelf system 500a that can be selectively connected to the rails 136. The movable and removable shelf systems 500a include a shelf 502. In the movable and removable shelf system 500a, a connection bar system 504 includes a bar 508 having a pair of surrounding clamps 506 at opposite ends thereof, with each surrounding clamp 506 surrounding one of the rails 136 to connect the connection bar system 504 to the rails 136. In an alternative embodiment of the movable and removable shelf system 500b as illustrated in FIG. 18B, the bar is split into space separate bars 508a. The bar 508 and each of the separate bars 508a include a shelf clamp system 510 (see FIG. 19). The shelf clamp system 510 includes a ramp 512 that leads to a top slot 514 formed by a cantilevered hook 516. The shelf 502 includes a rear curved edge 518 that corresponds to the curvature of the ramp 512. A lip 520 extends from a top surface of the rear curved edge 518, with the lip 520 being selectively inserted into the top slot 514 to lock the shelf 502 to the bar 508 or bars 508a. The shelf clamp system 510 allows for the shelf 502 to be easily removed from and connected to the service head 18 without the need for any tools to effect connection of the shelf 502 to the service head 18. To remove the shelf 502, simply lift the front edge of the shelf 502 to slide the lip 520 out of the top slot 514, thereby allowing the shelf 502 to be removed. To attach the shelf 502 to the bar 508 or bars 508a, simply reverse the movement outlined above and slide the lip 520 into the top slot 514.

In the illustrated suspension arm assembly 10, the service head 18 can be moved laterally using the suspension arm 14 and vertically using the vertically adjustable column 22. The conduits 20 are fixed in position relative to the end link 16 and the top of the vertically adjustable boom head assembly 12 by being fixed in position within the top pod 24 of the vertically adjustable column 22. Therefore, the conduits 20 are not subject to undue bending or torque at the top of the vertically adjustable boom head assembly 12 (e.g., because of the straps 86 holding the conduits 20). Likewise, the cinch plate 90 prevents the conduits 20 from bending or being subject to excessive torque forces between the cinch plate 90 and the outlets 138, 140, 142 (e.g., because of the grip paddles 106 holding the conduits 20). The receiving disc 58 provides an easy and convenient location for the routing of the conduits 20 between the straps 86 and the cinch plate 90 as the vertically adjustable boom head assembly 12 is raised and lowered. It is contemplated that the size of the top pod 24 can also be used as a soft bumper if the vertically adjustable boom head assembly 12 was to bump into other objects in the room to protect the suspension arm assembly 10 and could even include rollers with to help deflect the suspension arm assembly 10 off of the other objects. It is further contemplated that the service head 18 could swivel on the bottom of the vertically adjustable column 22, with the cinch plate 90 providing anti-rotation to prevent twisting of the conduits 20 passing therethrough as the service head 18 swivels.

It is contemplated that additional or other manners of assisting in routing the conduits 20 from the end link 16 to the outlets could be used. For example, an energy chain could be connected to the conduits 20 between a first anchor location in the top pod and a second anchor location in the vertically adjustable column 22 (with or without a cinch plate) could be used to move the conduits 20 within the top pod. Alternatively, a pulley system could be employed to move the conduits 20 between the first anchor location in the top pod and a second anchor location in the vertically adjustable column 22 (with or without a cinch plate), with the pulley system having a pair of movable vertically aligned pulley wheels for each conduit 20 or a group of conduits 20 that move toward each other as the vertically adjustable column 22 extends and away from each other as the vertically adjustable column 22 contracts.

The illustrated suspension arm assembly 10 can be used in any room and, in an embodiment, can be used in an operating room or critical care area. The suspension arm assembly 10 can be used in association with any surgical procedure. For example, the suspension arm assembly 10 can be used in association with anesthesia procedures, respiratory procedures, infusion procedures, laparoscopic procedures and endoscopic procedures (e.g., manual and robotic). This list is for examples only and not exhaustive. For some of the procedures, the suspension arm assembly 10 and any portion thereof can be used with a kit comprising a fluorescence imaging agent for imaging tissue in a surgical site (e.g., imaging blood flow, tissue perfusion, lymphatic tissue, tissue anatomy, or a combination thereof).

While the present disclosure has been illustrated and described in connection with various embodiments shown and described in detail, it is not intended to be limited to the details shown, since various modifications and structural changes may be made without departing in any way from the scope of the present disclosure. Various modifications of form, arrangement of components, steps, details and order of operations of the embodiments illustrated, as well as other embodiments of the disclosure, may be made without departing in any way from the scope of the present disclosure, and will be apparent to a person of skill in the art upon reference to this description. It is therefore contemplated that the appended claims will cover such modifications and embodiments as they fall within the true scope of the disclosure. For the purpose of clarity and a concise description, features are described herein as part of the same or separate embodiments, however, it will be appreciated that the scope of the disclosure includes embodiments having combinations of all or some of the features described. For the terms "for example" and "such as," and grammatical equivalences thereof, the phrase "and without limitation" is understood to follow unless explicitly stated otherwise. As used herein, the singular forms "a", "an", and "the" include plural referents unless the context clearly dictates otherwise.

What is claimed is:

1. A medical device assembly comprising:
   a vertically adjustable medical service head assembly for mounting to a suspension arm, the vertically adjustable medical service head assembly comprising:
   a medical service head, and
   a vertically adjustable column for vertically adjusting a position of the medical service head, the vertically adjustable column comprising at least one gripping assembly for gripping at least one conduit, the at least one gripping assembly comprising a plurality of grip paddles pivotally mounted within the vertically adjustable column around a central pathway through which the at least one conduit can be routed, wherein the grip paddles are configured to pivot inwardly relative to the central pathway to grip the at least one conduit.

2. The medical device assembly of claim 1, wherein the at least one gripping assembly comprises at least one tightener for tightening the plurality of grip paddles against the at least one conduit.

3. The medical device assembly of claim 2, wherein the at least one tightener comprises at least one band that engages the plurality of grip paddles.

4. The medical device assembly of claim 2, wherein the at least one tightener engages each grip paddle at an end that is opposite from a pivoting end of the grip paddle.

5. The medical device assembly of claim 1, wherein the plurality of grip paddles are biased in a pivoting direction.

6. The medical device assembly of claim 5, wherein the plurality of grip paddles are biased inwardly.

7. The medical device assembly of claim 1, wherein the medical device assembly is configured to collect slack in the at least one conduit is above the at least one gripping assembly.

8. The medical device assembly of claim 1, wherein the medical device assembly comprises the suspension arm.

\* \* \* \* \*